United States Patent
Kobayashi et al.

(10) Patent No.: US 6,256,276 B1
(45) Date of Patent: *Jul. 3, 2001

(54) DISK RECORDING AND REPRODUCING APPARATUS AND METHOD FOR USE IN A REWRITABLE TYPE DISK

(75) Inventors: Shoei Kobayashi, Kanagawa; Toru Takeda, Saitama; Tamotsu Yamagami, Kanagawa; Shozo Masuda, Tokyo, all of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,014

(22) Filed: Jun. 9, 1997

(30) Foreign Application Priority Data

Jun. 13, 1996 (JP) .................................................... 8-174289

(51) Int. Cl.[7] ........................................................ G11B 7/00
(52) U.S. Cl. .................. 369/47.31; 369/59.2; 369/59.24; 369/275.3
(58) Field of Search ................................. 369/47, 48, 58, 369/54, 124, 44.26, 59, 275.3

(56) References Cited

U.S. PATENT DOCUMENTS

| 5,216,657 | * | 6/1993 | Nishiuchi et al. | 369/59 |
|---|---|---|---|---|
| 5,343,455 | * | 8/1994 | Takeuchi et al. | 369/59 |
| 5,388,105 | * | 2/1995 | Takagi et al. | 369/44.32 |
| 5,434,991 | * | 7/1995 | Maeda et al. | 369/32 |
| 5,552,896 | * | 9/1996 | Yoshida | 369/275.3 |
| 5,608,704 | * | 3/1997 | Kim | 369/54 |
| 5,703,867 | * | 12/1997 | Miyauchi et al. | 369/275.3 |
| 5,953,299 | * | 9/1999 | Miyamoto et al. | 369/59 |
| 6,025,969 | | 2/2000 | Ishioka et al. | 360/77.01 |
| 6,031,814 | * | 2/2000 | Nagata et al. | 369/275.3 |
| 6,041,029 | | 3/2000 | Iida et al. | 369/50 |
| 6,064,639 | | 5/2000 | Sako et al. | 369/48 |

FOREIGN PATENT DOCUMENTS

| 0469727 A1 | | 2/1992 | (EP) . | |
|---|---|---|---|---|
| 594132 | * | 4/1994 | (EP) | 369/32 |
| 0613136 A2 | | 8/1994 | (EP) . | |
| 718831 | * | 6/1996 | (EP) | 369/48 |
| 0790613 A2 | | 8/1997 | (EP) . | |
| 0793234 A2 | | 9/1997 | (EP) . | |
| 0800172 A2 | | 10/1997 | (EP) . | |
| 0837471 A2 | | 4/1998 | (EP) . | |
| 8-010489 | | 1/1996 | (JP) . | |
| 97/30439 | | 8/1997 | (WO) . | |

OTHER PUBLICATIONS

Patent Abstracts of Japan, JP 4–153919, Published May 27, 1992, Nippon Telegraph & Telephone Corp.
Patent Abstracts of Japan, JP 63–229625, Published Sep. 26, 1988, Matsushita Electric Inc. Co. Ltd.

* cited by examiner

*Primary Examiner*—Nabil Hindi
(74) *Attorney, Agent, or Firm*—Oblon, Spivak, McClelland, Maier & Neustadt, P.C.

(57) ABSTRACT

Thermal stress is prevented from accumulating on a disk recording medium. Data to be recorded is divided into 32-kilobyte clusters, and a front link area and a back link area, whose lengths are randomly changed, formed of a total of 8 frames are added before and after the clusters. Then, the data is recorded on a predetermined area of a disk on the basis of address data prerecorded on the disk.

44 Claims, 31 Drawing Sheets

FIG. 12

| zone NO. | r(um) | frame/trk | trk/zone | EBLK/zone | bit min (um/b) | cap(byte) | rotation 1 (rpm) | vel.min.1 (m/s) | vel.max.1 (m/s) |
|---|---|---|---|---|---|---|---|---|---|
| 0 | 24000.0 | 520 | 424 | 520 | 0.390 | 17039360 | 2068 | 5.20 | 5.28 |
| 1 | 24368.9 | 528 | 424 | 528 | 0.390 | 17301504 | 2068 | 5.28 | 5.36 |
| 2 | 24737.9 | 536 | 424 | 536 | 0.390 | 17563648 | 2068 | 5.36 | 5.44 |
| 3 | 25106.6 | 544 | 424 | 544 | 0.390 | 17825792 | 2068 | 5.44 | 5.52 |
| 4 | 25475.5 | 552 | 424 | 552 | 0.390 | 18087936 | 2068 | 5.52 | 5.60 |
| 5 | 25844.4 | 560 | 424 | 560 | 0.390 | 18350080 | 2068 | 5.60 | 5.68 |
| 6 | 26213.3 | 568 | 424 | 568 | 0.390 | 18612224 | 2068 | 5.68 | 5.76 |
| 7 | 26582.2 | 576 | 424 | 576 | 0.390 | 18874368 | 2068 | 5.76 | 5.84 |
| 8 | 26951.0 | 584 | 424 | 584 | 0.390 | 19136512 | 2068 | 5.84 | 5.92 |
| 9 | 27319.9 | 592 | 424 | 592 | 0.390 | 19398656 | 2068 | 5.92 | 6.00 |
| 10 | 27688.8 | 600 | 424 | 600 | 0.390 | 19660800 | 2068 | 6.00 | 6.08 |
| 11 | 28057.7 | 608 | 424 | 608 | 0.390 | 19922944 | 2068 | 6.08 | 6.16 |
| 12 | 28426.6 | 616 | 424 | 616 | 0.390 | 20185088 | 2068 | 6.16 | 6.24 |
| 13 | 28795.4 | 624 | 424 | 624 | 0.390 | 20447232 | 2068 | 6.24 | 6.32 |
| 14 | 29164.3 | 632 | 424 | 632 | 0.390 | 20709376 | 2068 | 6.32 | 6.40 |
| 15 | 29533.2 | 640 | 424 | 640 | 0.390 | 20971520 | 2068 | 6.40 | 6.48 |
| 16 | 29902.1 | 648 | 424 | 648 | 0.390 | 21233664 | 2068 | 6.48 | 6.55 |
| 17 | 30271.0 | 656 | 424 | 656 | 0.390 | 21495808 | 2068 | 6.55 | 6.63 |
| 18 | 30639.8 | 664 | 424 | 664 | 0.390 | 21757952 | 2068 | 6.63 | 6.71 |
| 19 | 31008.7 | 672 | 424 | 672 | 0.390 | 22020096 | 2068 | 6.71 | 6.79 |
| 20 | 31377.6 | 680 | 424 | 680 | 0.390 | 22282240 | 2068 | 6.79 | 6.87 |
| 21 | 31746.5 | 688 | 424 | 688 | 0.390 | 22544384 | 2068 | 6.87 | 6.95 |
| 22 | 32115.4 | 696 | 424 | 696 | 0.390 | 22806528 | 2068 | 6.95 | 7.03 |
| 23 | 32484.2 | 704 | 424 | 704 | 0.390 | 23068672 | 2068 | 7.03 | 7.11 |

FIG. 13

| zone NO. | r(um) | frame/trk | trk/zone | EBLK/zone | bit min (um/b) | cap(byte) | rotation 1 (rpm) | vel.min.1 (m/s) | vel.max.1 (m/s) |
|---|---|---|---|---|---|---|---|---|---|
| 24 | 32853.1 | 712 | 424 | 712 | 0.390 | 23330816 | 2068 | 7.11 | 7.19 |
| 25 | 33222.0 | 720 | 424 | 720 | 0.390 | 23592960 | 2068 | 7.19 | 7.27 |
| 26 | 33590.9 | 728 | 424 | 728 | 0.390 | 23855104 | 2068 | 7.27 | 7.35 |
| 27 | 33959.8 | 736 | 424 | 736 | 0.390 | 24117248 | 2068 | 7.35 | 7.43 |
| 28 | 34328.6 | 744 | 424 | 744 | 0.390 | 24379392 | 2068 | 7.43 | 7.51 |
| 29 | 34697.5 | 752 | 424 | 752 | 0.390 | 24641536 | 2068 | 7.51 | 7.59 |
| 30 | 35066.4 | 760 | 424 | 760 | 0.390 | 24903680 | 2068 | 7.59 | 7.67 |
| 31 | 35435.3 | 768 | 424 | 768 | 0.390 | 25165824 | 2068 | 7.67 | 7.75 |
| 32 | 35804.2 | 776 | 424 | 776 | 0.390 | 25427968 | 2068 | 7.75 | 7.83 |
| 33 | 36173.0 | 784 | 424 | 784 | 0.390 | 25690112 | 2068 | 7.83 | 7.91 |
| 34 | 36541.9 | 792 | 424 | 792 | 0.390 | 25952256 | 2068 | 7.91 | 7.99 |
| 35 | 36910.8 | 800 | 424 | 800 | 0.390 | 26214400 | 2068 | 7.99 | 8.07 |
| 36 | 37279.7 | 808 | 424 | 808 | 0.390 | 26476544 | 2068 | 8.07 | 8.15 |
| 37 | 37648.6 | 816 | 424 | 816 | 0.390 | 26738688 | 2068 | 8.15 | 8.23 |
| 38 | 38017.4 | 824 | 424 | 824 | 0.390 | 27000832 | 2068 | 8.23 | 8.31 |
| 39 | 38386.3 | 832 | 424 | 832 | 0.390 | 27262976 | 2068 | 8.31 | 8.39 |
| 40 | 38755.2 | 840 | 424 | 840 | 0.390 | 27525120 | 2068 | 8.39 | 8.47 |
| 41 | 39124.1 | 848 | 424 | 848 | 0.390 | 27787264 | 2068 | 8.47 | 8.55 |
| 42 | 39493.0 | 856 | 424 | 856 | 0.390 | 28049408 | 2068 | 8.55 | 8.63 |
| 43 | 39861.8 | 864 | 424 | 864 | 0.390 | 28311552 | 2068 | 8.63 | 8.71 |
| 44 | 40230.7 | 872 | 424 | 872 | 0.390 | 28573696 | 2068 | 8.71 | 8.79 |
| 45 | 40599.6 | 880 | 424 | 880 | 0.390 | 28835840 | 2068 | 8.79 | 8.87 |
| 46 | 40968.5 | 888 | 424 | 888 | 0.390 | 29097984 | 2068 | 8.87 | 8.95 |
| 47 | 41337.4 | 896 | 424 | 896 | 0.390 | 29360128 | 2068 | 8.95 | 9.03 |

FIG. 14

| zone NO. | r(um) | frame/trk | trk/zone | EBLK/zone | bit min (um/b) | cap(byte) | rotation 1 (rpm) | vel.min.1 (m/s) | vel.max.1 (m/s) |
|---|---|---|---|---|---|---|---|---|---|
| 48 | 41706.2 | 904 | 424 | 904 | 0.390 | 29622272 | 2068 | 9.03 | 9.11 |
| 49 | 42075.1 | 912 | 424 | 912 | 0.390 | 29884416 | 2068 | 9.11 | 9.19 |
| 50 | 42444.0 | 920 | 424 | 920 | 0.390 | 30146560 | 2068 | 9.19 | 9.27 |
| 51 | 42812.9 | 928 | 424 | 928 | 0.390 | 30408704 | 2068 | 9.27 | 9.35 |
| 52 | 43181.8 | 936 | 424 | 936 | 0.390 | 30670848 | 2068 | 9.35 | 9.43 |
| 53 | 43550.6 | 944 | 424 | 944 | 0.390 | 30932992 | 2068 | 9.43 | 9.51 |
| 54 | 43919.5 | 952 | 424 | 952 | 0.390 | 31195136 | 2068 | 9.51 | 9.59 |
| 55 | 44288.4 | 960 | 424 | 960 | 0.390 | 31457280 | 2068 | 9.59 | 9.67 |
| 56 | 44657.3 | 968 | 424 | 968 | 0.390 | 31719424 | 2068 | 9.67 | 9.75 |
| 57 | 45026.2 | 976 | 424 | 976 | 0.390 | 31981568 | 2068 | 9.75 | 9.83 |
| 58 | 45395.0 | 984 | 424 | 984 | 0.390 | 32243712 | 2068 | 9.83 | 9.91 |
| 59 | 45763.9 | 992 | 424 | 992 | 0.390 | 32505856 | 2068 | 9.91 | 9.99 |
| 60 | 46132.8 | 1000 | 424 | 1000 | 0.390 | 32768000 | 2068 | 9.99 | 10.07 |
| 61 | 46501.7 | 1008 | 424 | 1008 | 0.390 | 33030144 | 2068 | 10.07 | 10.15 |
| 62 | 46870.6 | 1016 | 424 | 1016 | 0.390 | 33292288 | 2068 | 10.15 | 10.23 |
| 63 | 47239.4 | 1024 | 424 | 1024 | 0.390 | 33554432 | 2068 | 10.23 | 10.31 |
| 64 | 47608.3 | 1032 | 424 | 1032 | 0.390 | 33816576 | 2068 | 10.31 | 10.39 |
| 65 | 47977.2 | 1040 | 424 | 1040 | 0.390 | 34078720 | 2068 | 10.39 | 10.47 |
| 66 | 48346.1 | 1048 | 424 | 1048 | 0.390 | 34340864 | 2068 | 10.47 | 10.55 |
| 67 | 48715.0 | 1056 | 424 | 1056 | 0.390 | 34603008 | 2068 | 10.55 | 10.63 |
| 68 | 49083.8 | 1064 | 424 | 1064 | 0.390 | 34865152 | 2068 | 10.63 | 10.71 |
| 69 | 49452.7 | 1072 | 424 | 1072 | 0.390 | 35127296 | 2068 | 10.71 | 10.79 |
| 70 | 49821.6 | 1080 | 424 | 1080 | 0.390 | 35389440 | 2068 | 10.79 | 10.87 |
| 71 | 50190.5 | 1088 | 424 | 1088 | 0.390 | 35651584 | 2068 | 10.87 | 10.95 |

FIG. 15

| zone NO. | r(um) | frame/trk | trk/zone | EBLK/zone | bit min (um/b) | cap(byte) | rotation 1 (rpm) | vel.min.1 (m/s) | vel.max.1 (m/s) |
|---|---|---|---|---|---|---|---|---|---|
| 72 | 50559.4 | 1096 | 424 | 1096 | 0.390 | 35913728 | 2068 | 10.95 | 11.03 |
| 73 | 50928.2 | 1104 | 424 | 1104 | 0.390 | 36175872 | 2068 | 11.03 | 11.11 |
| 74 | 51297.1 | 1112 | 424 | 1112 | 0.390 | 36438016 | 2068 | 11.11 | 11.19 |
| 75 | 51666.0 | 1120 | 424 | 1120 | 0.390 | 36700160 | 2068 | 11.19 | 11.27 |
| 76 | 52034.9 | 1128 | 424 | 1128 | 0.390 | 36962304 | 2068 | 11.27 | 11.35 |
| 77 | 52403.8 | 1136 | 424 | 1136 | 0.390 | 37224448 | 2068 | 11.35 | 11.43 |
| 78 | 52772.6 | 1144 | 424 | 1144 | 0.390 | 37486592 | 2068 | 11.43 | 11.51 |
| 79 | 53141.5 | 1152 | 424 | 1152 | 0.390 | 37748736 | 2068 | 11.51 | 11.59 |
| 80 | 53510.4 | 1160 | 424 | 1160 | 0.390 | 38010880 | 2068 | 11.59 | 11.67 |
| 81 | 53879.3 | 1168 | 424 | 1168 | 0.390 | 38273024 | 2068 | 11.67 | 11.75 |
| 82 | 54248.2 | 1176 | 424 | 1176 | 0.390 | 38535168 | 2068 | 11.75 | 11.83 |
| 83 | 54617.0 | 1184 | 424 | 1184 | 0.390 | 38797312 | 2068 | 11.83 | 11.91 |
| 84 | 54985.9 | 1192 | 424 | 1192 | 0.390 | 39059456 | 2068 | 11.91 | 11.99 |
| 85 | 55354.8 | 1200 | 424 | 1200 | 0.390 | 39321600 | 2068 | 11.99 | 12.07 |
| 86 | 55723.7 | 1208 | 424 | 1208 | 0.390 | 39583744 | 2068 | 12.07 | 12.15 |
| 87 | 56092.6 | 1216 | 424 | 1216 | 0.390 | 39845888 | 2068 | 12.15 | 12.23 |
| 88 | 56461.4 | 1224 | 424 | 1224 | 0.390 | 40108032 | 2068 | 12.23 | 12.31 |
| 89 | 56830.3 | 1232 | 424 | 1232 | 0.390 | 40370176 | 2068 | 12.31 | 12.39 |
| 90 | 57199.2 | 1240 | 424 | 1240 | 0.390 | 40632320 | 2068 | 12.39 | 12.47 |
| 91 | 57568.1 | 1248 | 424 | 1248 | 0.390 | 40894464 | 2068 | 12.47 | 12.55 |
|  | 57937.0 |  | 39008 | 81328 |  | 2.665E+09 |  |  |  |
| track pitch | 0.87 |  |  | Band 1 | 647.2 29915.6 | Band 2 | 805.6 37289.2 | Band 3 | 1002.7 46480.4 |

FIG. 22

STATE 1 AND 2

| | (MSB) | (LSB) / (MSB) | (LSB) |
|---|---|---|---|
| SY0= | 0001001001000100 | 0000000000010001 / 0001001000000100 | 0000000000010001 |
| SY1= | 0000010000000100 | 0000000000010001 / 0000010001000100 | 0000000000010001 |
| SY2= | 0001001000000100 | 0000000000010001 / 0001001000010100 | 0000000000010001 |
| SY3= | 0000010000000100 | 0000000000010001 / 0000010001000100 | 0000000000010001 |
| SY4= | 0010000000000100 | 0000000000010001 / 0010000001000100 | 0000000000010001 |
| SY5= | 0010001001000100 | 0000000000010001 / 0010001000000100 | 0000000000010001 |
| SY6= | 0010010010000100 | 0000000000010001 / 0010000010000100 | 0000000000010001 |
| SY7= | 0010010001000100 | 0000000000010001 / 0010010000000100 | 0000000000010001 |

STATE 3 AND 4

| | (MSB) | (LSB) / (MSB) | (LSB) |
|---|---|---|---|
| SY0= | 1001001000000100 | 0000000000010001 / 1001001001000100 | 0000000000010001 |
| SY1= | 1000010001000100 | 0000000000010001 / 1000010000000100 | 0000000000010001 |
| SY2= | 1001000001000100 | 0000000000010001 / 1001000000000100 | 0000000000010001 |
| SY3= | 1000010001000100 | 0000000000010001 / 1000010000000100 | 0000000000010001 |
| SY4= | 1000100001000100 | 0000000000010001 / 1000100000000100 | 0000000000010001 |
| SY5= | 1000100100000100 | 0000000000010001 / 1000000100000100 | 0000000000010001 |
| SY6= | 1001001010000100 | 0000000000010001 / 1000000010000100 | 0000000000010001 |
| SY7= | 1000100010000100 | 0000000000010001 / 1000000010000100 | 0000000000010001 |

ZONING

| | TRACKS | r(mm) | NO. OF FRAMES | ZONE CAPA. |
|---|---|---|---|---|
| ZONE 0 | 424 | 24.00 | 520 X 424 | 520 X32 kB |
| ZONE 1 | 424 | 24.36 | 528 X 424 | 528 X32 kB |
| ⋮ | ⋮ | ⋮ | ⋮ | ⋮ |
| ZONE91 | 424 | 57.57 | 1248 X 424 | 1248 X32 kB |

FIG. 37

| zone NO. | r(um) | frame/trk | trk/zone | EBLK/zone | bit min (um/b) | cap(byte) | rotation 2 (rpm) | vel.min.2 (m/s) | vel.max.2 (m/s) |
|---|---|---|---|---|---|---|---|---|---|
| 0 | 24000.0 | 520 | 424 | 520 | 0.390 | 17039360 | 2068 | 5.20 | 5.28 |
| 1 | 24368.9 | 528 | 424 | 528 | 0.390 | 17301504 | 2068 | 5.28 | 5.36 |
| 2 | 24737.9 | 536 | 424 | 536 | 0.390 | 17563648 | 2068 | 5.36 | 5.44 |
| 3 | 25106.6 | 544 | 424 | 544 | 0.390 | 17825792 | 2068 | 5.44 | 5.52 |
| 4 | 25475.5 | 552 | 424 | 552 | 0.390 | 18087936 | 2068 | 5.52 | 5.60 |
| 5 | 25844.4 | 560 | 424 | 560 | 0.390 | 18350080 | 2068 | 5.60 | 5.68 |
| 6 | 26213.3 | 568 | 424 | 568 | 0.390 | 18612224 | 2068 | 5.68 | 5.76 |
| 7 | 26582.2 | 576 | 424 | 576 | 0.390 | 18874368 | 2068 | 5.76 | 5.84 |
| 8 | 26951.0 | 584 | 424 | 584 | 0.390 | 19136512 | 2068 | 5.84 | 5.92 |
| 9 | 27319.9 | 592 | 424 | 592 | 0.390 | 19398656 | 2068 | 5.92 | 6.00 |
| 10 | 27688.8 | 600 | 424 | 600 | 0.390 | 19660800 | 2068 | 6.00 | 6.08 |
| 11 | 28057.7 | 608 | 424 | 608 | 0.390 | 19922944 | 2068 | 6.08 | 6.16 |
| 12 | 28426.6 | 616 | 424 | 616 | 0.390 | 20185088 | 2068 | 6.16 | 6.24 |
| 13 | 28795.4 | 624 | 424 | 624 | 0.390 | 20447232 | 2068 | 6.24 | 6.32 |
| 14 | 29164.3 | 632 | 424 | 632 | 0.390 | 20709376 | 2068 | 6.32 | 6.40 |
| 15 | 29533.2 | 640 | 424 | 640 | 0.390 | 20971520 | 2068 | 6.40 | 6.48 |
| 16 | 29902.1 | 648 | 424 | 648 | 0.390 | 21233664 | 2068 | 6.48 | 5.26 |
| 17 | 30271.0 | 656 | 424 | 656 | 0.390 | 21495808 | 1659 | 5.20 | 5.32 |
| 18 | 30639.8 | 664 | 424 | 664 | 0.390 | 21757952 | 1659 | 5.26 | 5.39 |
| 19 | 31008.7 | 672 | 424 | 672 | 0.390 | 22020096 | 1659 | 5.32 | 5.45 |
| 20 | 31377.6 | 680 | 424 | 680 | 0.390 | 22282240 | 1659 | 5.39 | 5.52 |
| 21 | 31746.5 | 688 | 424 | 688 | 0.390 | 22544384 | 1659 | 5.45 | 5.58 |
| 22 | 32115.4 | 696 | 424 | 696 | 0.390 | 22806528 | 1659 | 5.52 | 5.64 |
| 23 | 32484.2 | 704 | 424 | 704 | 0.390 | 23068672 | 1659 | 5.58 | 5.71 |

FIG. 38

| zone NO. | r(um) | frame/trk | trk/zone | EBLK/zone | bit min (um/b) | cap(byte) | rotation 2 (rpm) | vel.min.2 (m/s) | vel.max.2 (m/s) |
|---|---|---|---|---|---|---|---|---|---|
| 24 | 32853.1 | 712 | 424 | 712 | 0.390 | 23330816 | 1659 | 5.71 | 5.77 |
| 25 | 33222.0 | 720 | 424 | 720 | 0.390 | 23592960 | 1659 | 5.77 | 5.84 |
| 26 | 33590.9 | 728 | 424 | 728 | 0.390 | 23855104 | 1659 | 5.84 | 5.90 |
| 27 | 33959.8 | 736 | 424 | 736 | 0.390 | 24117248 | 1659 | 5.90 | 5.97 |
| 28 | 34328.6 | 744 | 424 | 744 | 0.390 | 24379392 | 1659 | 5.97 | 6.03 |
| 29 | 34697.5 | 752 | 424 | 752 | 0.390 | 24641536 | 1659 | 6.03 | 6.09 |
| 30 | 35066.4 | 760 | 424 | 760 | 0.390 | 24903680 | 1659 | 6.09 | 6.16 |
| 31 | 35435.3 | 768 | 424 | 768 | 0.390 | 25165824 | 1659 | 6.16 | 6.22 |
| 32 | 35804.2 | 776 | 424 | 776 | 0.390 | 25427968 | 1659 | 6.22 | 6.29 |
| 33 | 36173.0 | 784 | 424 | 784 | 0.390 | 25690112 | 1659 | 6.29 | 6.35 |
| 34 | 36541.9 | 792 | 424 | 792 | 0.390 | 25952256 | 1659 | 6.35 | 6.41 |
| 35 | 36910.8 | 800 | 424 | 800 | 0.390 | 26214400 | 1659 | 6.41 | 5.20 |
| 36 | 37279.7 | 808 | 424 | 808 | 0.390 | 26476544 | 1331 | 5.20 | 5.25 |
| 37 | 37648.6 | 816 | 424 | 816 | 0.390 | 26738688 | 1331 | 5.25 | 5.30 |
| 38 | 38017.4 | 824 | 424 | 824 | 0.390 | 27000832 | 1331 | 5.30 | 5.35 |
| 39 | 38386.3 | 832 | 424 | 832 | 0.390 | 27262976 | 1331 | 5.35 | 5.40 |
| 40 | 38755.2 | 840 | 424 | 840 | 0.390 | 27525120 | 1331 | 5.40 | 5.45 |
| 41 | 39124.1 | 848 | 424 | 848 | 0.390 | 27787264 | 1331 | 5.45 | 5.50 |
| 42 | 39493.0 | 856 | 424 | 856 | 0.390 | 28049408 | 1331 | 5.50 | 5.56 |
| 43 | 39861.8 | 864 | 424 | 864 | 0.390 | 28311552 | 1331 | 5.56 | 5.61 |
| 44 | 40230.7 | 872 | 424 | 872 | 0.390 | 28573696 | 1331 | 5.61 | 5.66 |
| 45 | 40599.6 | 880 | 424 | 880 | 0.390 | 28835840 | 1331 | 5.66 | 5.71 |
| 46 | 40968.5 | 888 | 424 | 888 | 0.390 | 29097984 | 1331 | 5.71 | 5.76 |
| 47 | 41337.4 | 896 | 424 | 896 | 0.390 | 29360128 | 1331 | 5.76 | 5.81 |

FIG. 39

| zone NO. | r(um) | frame/trk | trk/zone | EBLK/zone | bit min (um/b) | cap(byte) | rotation 2 (rpm) | vel.min.2 (m/s) | vel.max.2 (m/s) |
|---|---|---|---|---|---|---|---|---|---|
| 48 | 41706.2 | 904 | 424 | 904 | 0.390 | 29622272 | 1331 | 5.81 | 5.86 |
| 49 | 42075.1 | 912 | 424 | 912 | 0.390 | 29884416 | 1331 | 5.86 | 5.91 |
| 50 | 42444.0 | 920 | 424 | 920 | 0.390 | 30146560 | 1331 | 5.91 | 5.97 |
| 51 | 42812.9 | 928 | 424 | 928 | 0.390 | 30408704 | 1331 | 5.97 | 6.02 |
| 52 | 43181.8 | 936 | 424 | 936 | 0.390 | 30670848 | 1331 | 6.02 | 6.07 |
| 53 | 43550.6 | 944 | 424 | 944 | 0.390 | 30932992 | 1331 | 6.07 | 6.12 |
| 54 | 43919.5 | 952 | 424 | 952 | 0.390 | 31195136 | 1331 | 6.12 | 6.17 |
| 55 | 44288.4 | 960 | 424 | 960 | 0.390 | 31457280 | 1331 | 6.17 | 6.22 |
| 56 | 44657.3 | 968 | 424 | 968 | 0.390 | 31719424 | 1331 | 6.22 | 6.27 |
| 57 | 45026.2 | 976 | 424 | 976 | 0.390 | 31981568 | 1331 | 6.27 | 6.33 |
| 58 | 45395.0 | 984 | 424 | 984 | 0.390 | 32243712 | 1331 | 6.33 | 6.38 |
| 59 | 45763.9 | 992 | 424 | 992 | 0.390 | 32505856 | 1331 | 6.38 | 5.19 |
| 60 | 46132.8 | 1000 | 424 | 1000 | 0.390 | 32768000 | 1075 | 5.19 | 5.24 |
| 61 | 46501.7 | 1008 | 424 | 1008 | 0.390 | 33030144 | 1075 | 5.24 | 5.32 |
| 62 | 46870.6 | 1016 | 424 | 1016 | 0.390 | 33292288 | 1075 | 5.32 | 5.28 |
| 63 | 47239.4 | 1024 | 424 | 1024 | 0.390 | 33554432 | 1075 | 5.28 | 5.36 |
| 64 | 47608.3 | 1032 | 424 | 1032 | 0.390 | 33816576 | 1075 | 5.36 | 5.40 |
| 65 | 47977.2 | 1040 | 424 | 1040 | 0.390 | 34078720 | 1075 | 5.40 | 5.44 |
| 66 | 48346.1 | 1048 | 424 | 1048 | 0.390 | 34340864 | 1075 | 5.44 | 5.49 |
| 67 | 48715.0 | 1056 | 424 | 1056 | 0.390 | 34603008 | 1075 | 5.49 | 5.53 |
| 68 | 49083.8 | 1064 | 424 | 1064 | 0.390 | 34865152 | 1075 | 5.53 | 5.57 |
| 69 | 49452.7 | 1072 | 424 | 1072 | 0.390 | 35127296 | 1075 | 5.57 | 5.61 |
| 70 | 49821.6 | 1080 | 424 | 1080 | 0.390 | 35389440 | 1075 | 5.61 | 5.65 |
| 71 | 50190.5 | 1088 | 424 | 1088 | 0.390 | 35651584 | 1075 | 5.65 | 5.69 |

FIG. 40

| zone NO. | r(um) | frame/trk | trk/zone | EBLK/zone | bit min (um/b) | cap(byte) | rotation 2 (rpm) | vel.min.2 (m/s) | vel.max.2 (m/s) |
|---|---|---|---|---|---|---|---|---|---|
| 72 | 50559.4 | 1096 | 424 | 1096 | 0.390 | 35913728 | 1075 | 5.69 | 5.73 |
| 73 | 50928.2 | 1104 | 424 | 1104 | 0.390 | 36175872 | 1075 | 5.73 | 5.78 |
| 74 | 51297.1 | 1112 | 424 | 1112 | 0.390 | 36438016 | 1075 | 5.78 | 5.82 |
| 75 | 51666.0 | 1120 | 424 | 1120 | 0.390 | 36700160 | 1075 | 5.82 | 5.86 |
| 76 | 52034.9 | 1128 | 424 | 1128 | 0.390 | 36962304 | 1075 | 5.86 | 5.90 |
| 77 | 52403.8 | 1136 | 424 | 1136 | 0.390 | 37224448 | 1075 | 5.90 | 5.94 |
| 78 | 52772.6 | 1144 | 424 | 1144 | 0.390 | 37486592 | 1075 | 5.94 | 5098 |
| 79 | 53141.5 | 1152 | 424 | 1152 | 0.390 | 37748736 | 1075 | 5098 | 6.03 |
| 80 | 53510.4 | 1160 | 424 | 1160 | 0.390 | 38010880 | 1075 | 6.03 | 6.07 |
| 81 | 53879.3 | 1168 | 424 | 1168 | 0.390 | 38273024 | 1075 | 6.07 | 6.11 |
| 82 | 54248.2 | 1176 | 424 | 1176 | 0.390 | 38535168 | 1075 | 6.11 | 6.15 |
| 83 | 54617.0 | 1184 | 424 | 1184 | 0.390 | 38797312 | 1075 | 6.15 | 6.19 |
| 84 | 54985.9 | 1192 | 424 | 1192 | 0.390 | 39059456 | 1075 | 6.19 | 6.23 |
| 85 | 55354.8 | 1200 | 424 | 1200 | 0.390 | 39321600 | 1075 | 6.23 | 6.27 |
| 86 | 55723.7 | 1208 | 424 | 1208 | 0.390 | 39583744 | 1075 | 6.27 | 6.32 |
| 87 | 56092.6 | 1216 | 424 | 1216 | 0.390 | 39845888 | 1075 | 6.32 | 6.36 |
| 88 | 56461.4 | 1224 | 424 | 1224 | 0.390 | 40108032 | 1075 | 6.36 | 6.40 |
| 89 | 56830.3 | 1232 | 424 | 1232 | 0.390 | 40370176 | 1075 | 6.40 | 6.44 |
| 90 | 57199.2 | 1240 | 424 | 1240 | 0.390 | 40632320 | 1075 | 6.44 | 6.48 |
| 91 | 57568.1 | 1248 | 424 | 1248 | 0.390 | 40894464 | 1075 | 6.48 | 6.52 |
|  | 57937.0 |  | 39008 | 81328 |  | 2.665E+09 |  |  |  |
|  |  |  |  | Band 1 | 647.2 29915.6 | Band 2 |  |  |  | track pitch 0.87

DISK RECORDING AND REPRODUCING APPARATUS AND METHOD FOR USE IN A REWRITABLE TYPE DISK

BACKGROUND OF THE INVENTION

1. Field of the Invention

The present invention relates to a recording and reproduction apparatus and method, and a disk. More particularly, the present invention relates to a recording and reproduction apparatus and method, and a disk, in which thermal stress is prevented from accumulating on a recording medium when data is repeatedly recorded on a disk.

2. Description of the Related Art

A conventional recording apparatus records data by modulating the intensity of a laser beam on the basis of data to be recorded and radiating it onto a disk, and causing a physical change in a recording medium.

In such conventional recording apparatuses, data is recorded on the basis of address information prerecorded on a disk. Therefore, when data is recorded with specific address information being specified, the area where the data is recorded is predetermined on the disk.

For example, it is known in a rewritable-type disk that, when a recording laser beam is repeatedly radiated onto the same area, thermal stress is accumulated on a recording medium. As a result, accurately recording data becomes difficult.

When data is recorded on a disk, it is necessary to record a signal for synchronization (hereinafter abbreviated as a synchronization signal) together with the data to be recorded in order to synchronize signals during reproduction. Since information (content) in such a synchronization signal is often determined according to the position (address) on the disk, a specific synchronization signal is provided for a predetermined address.

Therefore, when data is repeatedly recorded (overwritten) on a rewritable-type disk, the same synchronization signal is repeatedly written on the same portion of the disk. As a result, there is a problem in that thermal stress accumulates on that portion of the recording medium, and it becomes difficult to accurately reproduce a synchronization signal.

Accordingly, in order to solve such problems, a recording method for randomly changing the recording start point of recording data is disclosed in Japanese Patent Publication No. 8-10489. However, such a method has problems in that since data recorded on a disk is noncontinuous, it is difficult to provide recording timing during recording.

SUMMARY OF THE INVENTION

The present invention has been achieved in view of such circumstances. The present invention makes it possible to prevent thermal stress from accumulating on a recording medium even when overwriting is performed on a rewritable-type disk and to record data continuously.

The recording and reproduction apparatus of claim 1 comprises: division means for dividing data into blocks of a predetermined length; recording and reproduction unit formation means for forming a recording and reproduction unit by adding a front link area and a back link area of a predetermined length before and after the block, respectively; address detection means for detecting an address prerecorded on the rewritable-type disk; and recording means for recording the recording and reproduction unit on a predetermined area of the rewritable-type disk on the basis of an output from the address detection means.

The recording and reproduction method of claim 10 comprises: a dividing step for dividing data into blocks of a predetermined length; a recording and reproduction unit formation step for forming a recording and reproduction unit by adding a front link area of a predetermined length and a back link area of a predetermined length before and after the block, respectively; an address detection step for detecting an address prerecorded on the rewritable-type disk; and a recording step for recording the recording and reproduction unit on a predetermined area of the rewritable-type disk on the basis of the address detected in the address detection step.

In the disk of claim 11, a recording and reproduction unit formed in such a way that a front link area and a back link area are respectively added before and after data divided into a predetermined length is recorded thereon. The lengths of the front link area and the back link area are randomly changed so that the recording and reproduction unit has a fixed length.

In the recording and reproduction apparatus of claim 1, the division means divides data into blocks of a predetermined length, the recording and reproduction unit formation means forms a recording and reproduction unit by respectively adding a front link area and a back link area of a predetermined length before and after the block, the address detection means detects an address prerecorded on a rewritable-type disk, and the recording means records the recording and reproduction unit on a predetermined area of the rewritable-type disk on the basis of an output from the address detection means. For example, data to be recorded is divided into blocks of a predetermined length by the division means, a front link area and a back link area are respectively added before and after the block, and a recording and reproduction unit to which the front and back link areas are added is recorded on a disk on the basis of the address detected by the address detection means.

In the recording and reproduction method of claim 10, data is divided into blocks of a predetermined length in the division step, a recording and reproduction unit is formed by adding a front link area and a back link area of a predetermined length before and after the block, respectively, in the recording and reproduction unit formation step, the address prerecorded on a rewritable-type disk is detected in an address detection step, and the recording and reproduction unit is recorded on a predetermined area of the rewritable-type disk on the basis of an output from the address detection step in the recording step. For example, data to be recorded is divided into blocks of a predetermined length in the division step, a front link area and a back link area are added respectively before and after the block, and a recording and reproduction unit to which the front link area and the back link area are added is recorded on a disk on the basis of the address detected in the address detection step.

In the disk of claim 11, a recording and reproduction unit formed in such a way that a front link area and a back link area are respectively added before and after data divided into a predetermined length is recorded thereon, and the recording and reproduction unit is recorded with the lengths of the front link area and the back link area randomly changed so that the recording and reproduction unit has a fixed length. For example, a recording and reproduction unit is formed in such a way that a front link area and a back link area whose lengths are randomly changed are respectively added before and after the data divided into a predetermined length, and the recording and reproduction unit is recorded.

The above and further objects, aspects and novel features of the invention will become more apparent from the following detailed description when read in connection with the accompanying drawings.

BRIEF DESCRIPTION OF THE DRAWINGS

FIG. 12 shows parameters of each zone;

FIG. 13 shows parameters of each zone;

FIG. 14 shows parameters of each zone;

FIG. 15 shows parameters of each zone;

FIG. 22 shows an example of the frame synchronization signal shown in FIG. 21;

FIG. 37 shows parameters when the disk is divided into four bands;

FIG. 38 shows parameters when the disk is divided into four bands;

FIG. 39 shows parameters when the disk is divided into four bands; and

FIG. 40 shows parameters when the disk is divided into four bands.

DESCRIPTION OF THE PREFERRED EMBODIMENT

Figure 1A:
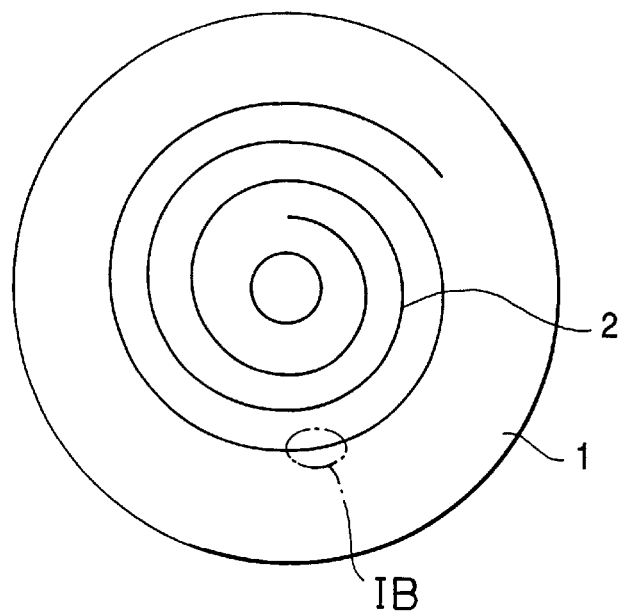
FIGS. 1A and 1B show a state in which a disk of the present invention is wobbled.
Figure 1B:
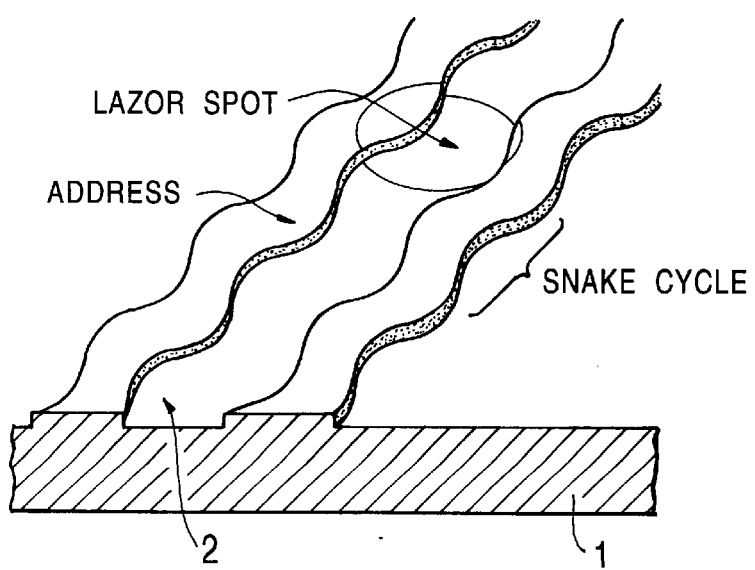

FIGS. 1A and 1B show an example of the construction of an optical disk in which a disk of the present invention is applied. As shown in the figure, a pre-groove 2 is formed beforehand in a spiral shape from the inner region toward the outer region in a disk (optical disk) 1. Of course, this pre-groove 2 may be formed in a concentric shape.

Further, as is shown by a portion of the pre-groove 2 exploded in FIG. 1B, the left and right side walls of the pre-groove 2 are wobbled on the basis of address information and are snaked in accordance with a frequency-modulated wave. One track has a plurality of wobbling address frames.

Figure 2:
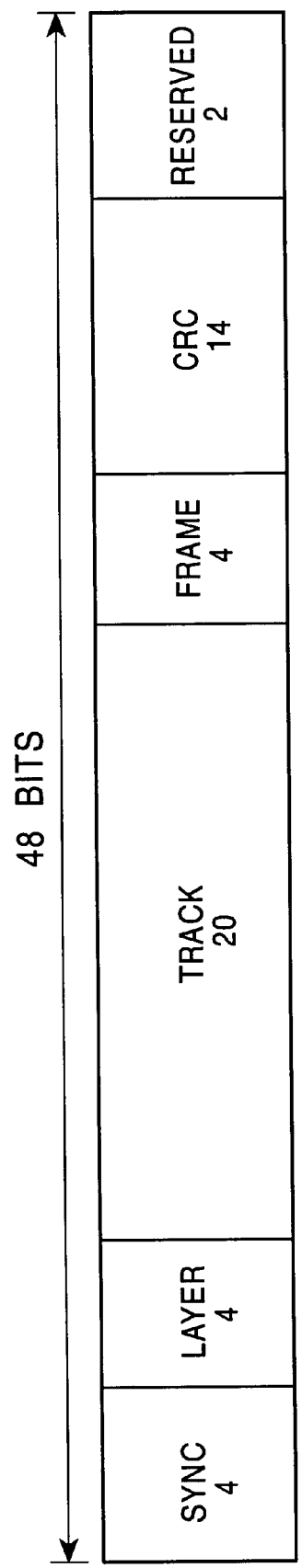
FIG. 2 shows an example of the structure of a wobbling address frame.

FIG. 2 shows the structure (format) of a wobbling address frame. As shown in the figure, the wobbling address frame is formed of 48 bits, with the beginning 4 bits being a synchronization signal (Sync) indicating the start of a rewritable-type disk. The next 4 bits are made into a layer (Layer) indicating which layer from among a plurality of recording layers. The next 20 bits are made a track address (track number). Further, the next 4 bits indicate the frame number of the address frame. The subsequent 14 bits are made an error detection code (CRC), and an error detection code for data such as if a synchronization signal (Sync) is excluded is recorded. The last 2 bits (Reserved) are kept in reserve for future use.

The wobbling address frame is recorded in a CAV disk shape whose rotational angular velocity is fixed, for example, for an amount of 8 address frames per one track (one rotation). Therefore, as frame numbers in FIG. 2, for example, values from 0 to 7 are recorded.

Figure 3:
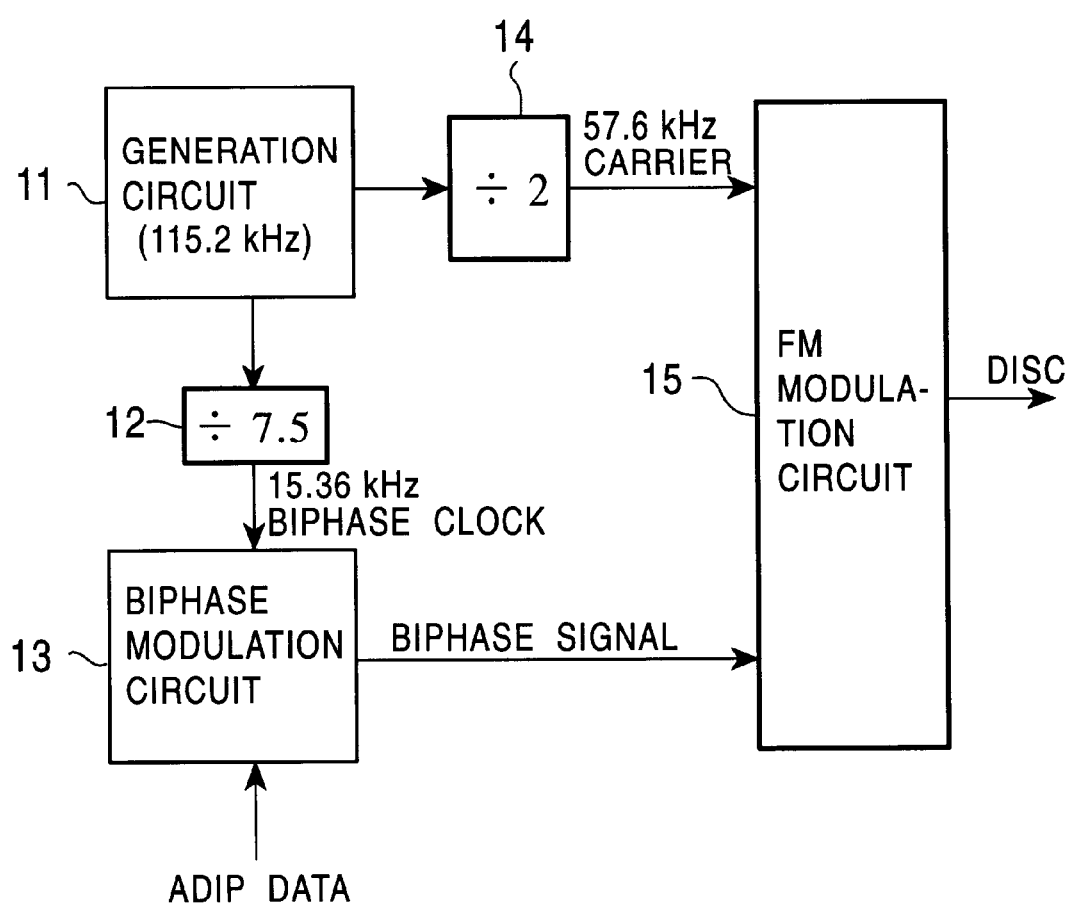
FIG. 3 shows an example of the construction of a wobbling signal generation circuit.

FIG. 3 shows an example of the construction of a wobbling signal generation circuit which generates a wobbling signal for wobbling the pre-groove 2 on the basis of the address frame of the format shown in FIG. 2. A generation circuit 11 generates a signal having a frequency of 115.2 kHz. The signal generated from the generation circuit 11 is supplied to a division circuit 12 whereby the signal is divided by a value 7.5, and is supplied as a biphase clock signal having a frequency of 15.36 kHz to a biphase modulation circuit 13. ADIP (Address In Pre-groove) data of a frame format shown in FIG. 2 is further supplied to the biphase modulation circuit 13.

The biphase modulation circuit 13 biphase-modulates a biphase clock supplied from the division circuit 12 by ADIP data (address data) supplied from a circuit (not shown) and outputs a biphase signal to an FM modulation circuit 15. A carrier having a frequency of 57.6 kHz obtained by dividing a signal of 115.2 kHz generated by the generation circuit 11 with a value 2 by means of a divider 14 is further input to the FM modulation circuit 15. The FM modulation circuit 15 frequency-modulates the carrier input from the divider 14 by a biphase signal input from the biphase modulation circuit 13 and outputs a frequency-modulated signal obtained thereby. The left and right side walls of the pre-groove 2 of the disk 1 are formed (wobbled) in accordance with this frequency-modulated signal.

Figure 4:
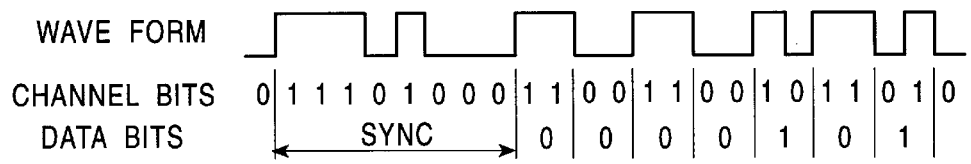
FIG. 4 shows an example of a biphase signal output from a biphase modulation circuit 13 of FIG. 3.
Figure 5:
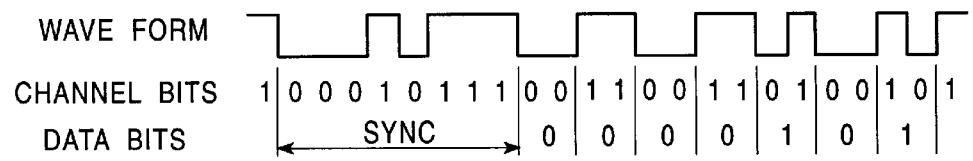
FIG. 5 shows another example of the biphase signal output from the biphase modulation circuit 13 of FIG. 3.

FIGS. 4 and 5 show examples of a biphase signal output from the biphase modulation circuit 13. In this embodiment, when the leading bit is "0", as shown in FIG. 4, "11101000" is used as a synchronization pattern (SYNC), and when the leading bit is "1", as shown in FIG. 5, "00010111" in a phase opposite to the case shown in FIG. 4 is used. SYNC is made a unique pattern as an exception to the rule which does not appear in the modulation.

A "0" of the data bits (Data Bits) of the address data (ADIP data) is biphase-modulated and converted into channel bits (Channel Bits) of "11" (when the previous channel bit is 0) or "00" (when the previous channel bit is 1). Further, a "1" is converted into channel bits of "10" (when the previous channel bit is 0) or "01" (when the previous channel bit is 1). Which of the two patterns this is converted into depends upon the previous code. That is, the "Wave Form" in FIGS. 4 and 5 is such that patterns of 1,0 of channel bits are expressed with 1 being a high level and 0 being a low level. Any one of the two patterns is selected so that this waveform continues.

Figure 6:
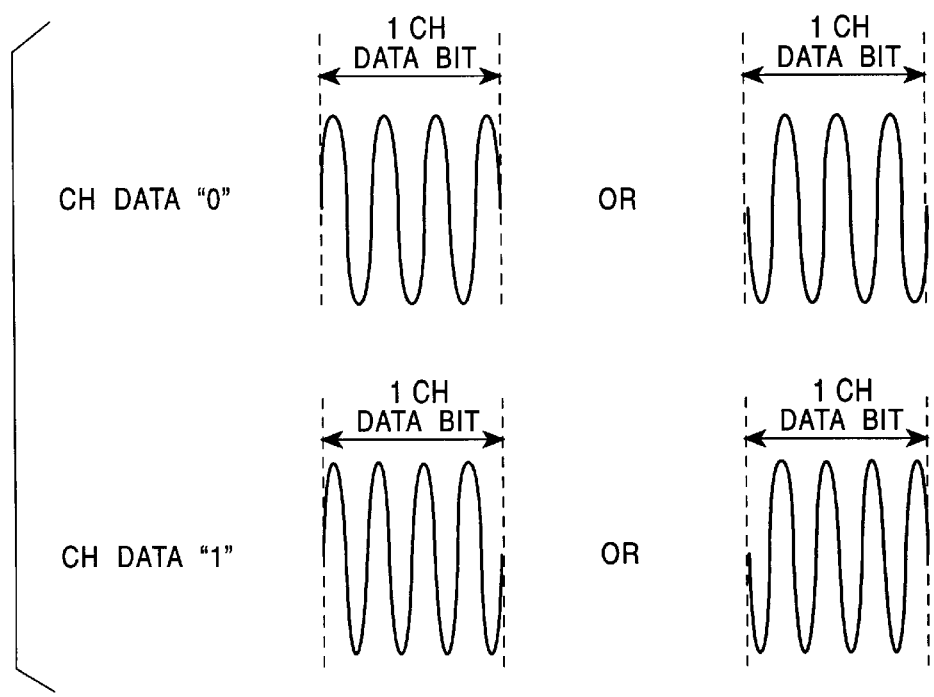
FIG. 6 shows frequency modulation performed by an FM modulation circuit 15 of FIG. 3.

The FM modulation circuit 15 frequency-modulates a carrier supplied from the divider 14 as shown in FIG. 6 in accordance with the biphase signal shown in FIGS. 4 or 5.

That is, when the channel bit data (biphase signal) is 0, the FM modulation circuit 15 outputs a carrier of 3.5 waves in a period corresponding to the length of half of one data bit. This carrier of 3.5 waves is a carrier which begins from a positive half wave or a negative half wave.

In comparison, when the channel bit data (biphase signal) is 1, a carrier of 4 waves is output in a period corresponding to the length of half of one data bit. This carrier of 4 waves also is a carrier which begins from a positive half wave or a negative half wave.

Therefore, when channel data bits 00 are input in correspondence with data 0, the FM modulation circuit 15 outputs a frequency-modulated wave of 7 waves (=3.5+3.5) in a period corresponding to the length of the data bits, and outputs a frequency-modulated wave of 8 waves (=4+4) when channel data bits 11 are input. Further, when channel data bits 10 or 01 are input in correspondence with data 1, a frequency-modulated wave of 7.5 waves (=4+3.5=3.5+4) is output.

The carrier of 57.6 kHz input to the FM modulation circuit 15 corresponds to a 7.5 wave. In correspondence with data, the FM modulation circuit 15 generates this carrier of 7.5 waves, or a frequency-modulated wave of 7 or 8 waves such that the carrier of 7.5 waves is shifted by ±6.67% (=0.5/7.5).

As described above, regarding carriers which begin from a positive half wave and a negative half wave, corresponding to channel data 0 and 1, respectively, a carrier which is continuous to the previous signal is selected.

Figure 7:
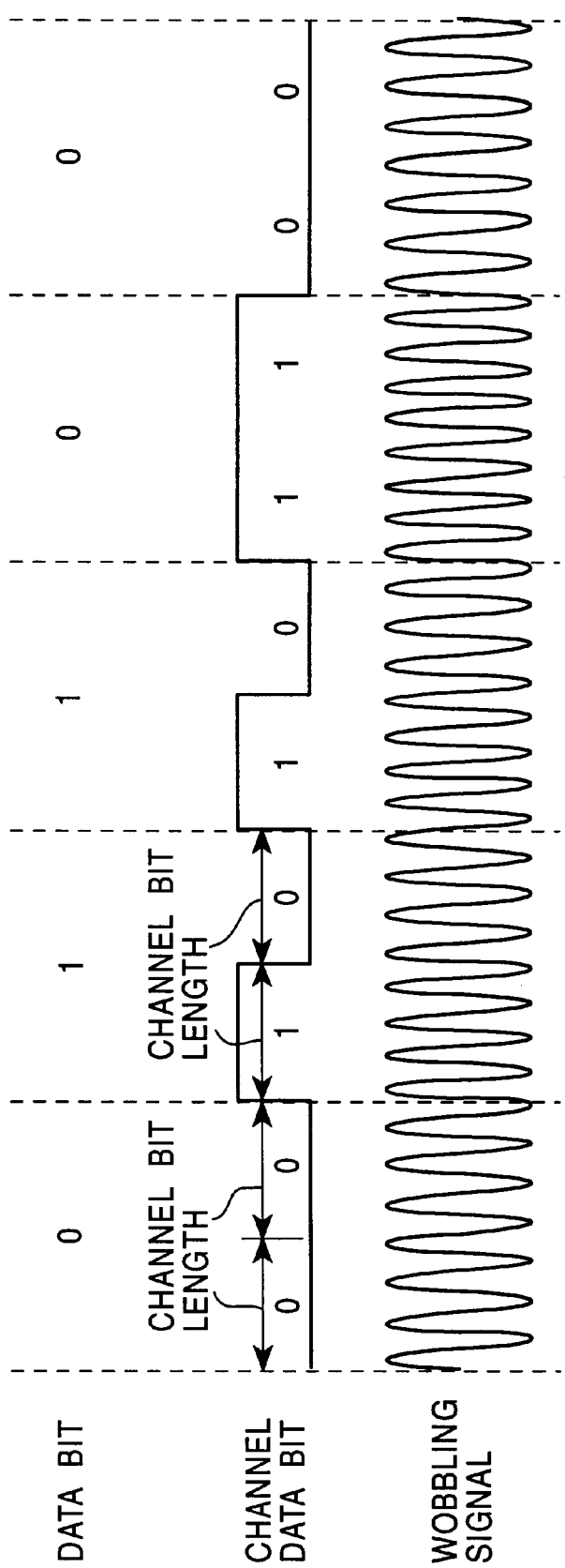
FIG. 7 shows a frequency-modulated wave output from the FM modulation circuit 15 of FIG. 3.

FIG. 7 shows an example of a frequency-modulated wave output in this way from the FM modulation circuit 15. In this example, the first data bit is made 0, and its channel data bits are made 00. With respect to the beginning channel data bit 0, a carrier of 3.5 waves which begins from a positive half wave from the starting point is selected. As a result, the termination point of the carrier terminates at a positive half wave. Therefore, with respect to the next channel data bit 0, a 3.5 wave which begins from a negative half wave is selected, and thus a frequency-modulated wave of a total of 7 waves is formed with respect to data bit 0.

This data bit 0 is followed by data bit 1 (channel bit 10). Since the 3.5 waves of the channel data bit corresponding to the previous data bit 0 terminate at a negative half wave, a carrier of 4 waves of the beginning channel data bit 1 corresponding to data bit 1, which begins from a positive half wave, is selected. Since the 4 waves of the channel data bit 1 terminate at a negative half wave, the 4 waves of the next channel data bit 0, which begin from a positive half wave, are selected.

Hereinafter, in a similar manner, carriers of 7.5 waves, 8 waves and 7 waves, in correspondence with data bit 1 (channel data bit 10), data bit 0 (channel data bit 11), and data bit 0 (channel data bit 00), are formed in such a manner as to be continuous at the boundary portions (the beginning point and the termination point) of the data bits and are output.

As shown in FIG. 7, in this embodiment, the length of the channel bits is made an integral multiple of ½ of the wavelength of the carrier in the case of 7, 7.5 or 8 waves. That is, the length of the channel bits is made 7 times ½ of the wavelength of the carrier (frequency-modulated wave) of 7 waves, and is made 8 times ½ of the wavelength of the carrier (frequency-modulated wave) of 8 waves. Further, the length of the channel bits is made 7 times ½ of 7.5 waves (when the channel bit is 0), and is made 8 times thereof (when the channel bit is 1).

Furthermore, in this embodiment, the boundary portion (the beginning point or the termination point) of the channel bits which are biphase-modulated is made a zero-cross point of the frequency-modulated wave. As a result, the phases of the address data (channel bit data) and the frequency-modulated wave coincide with each other, and the identification of the boundary portion of the bits is easy, making it possible to prevent erroneous detection of the address data bits. As a result, it becomes easy to accurately reproduce address information.

Further, in this embodiment, the boundary portions (the beginning point and the termination point) of the data bits are made to correspond to the edges (the zero-cross points) of the frequency-modulated wave. As a result, it is also possible to generate a clock with the edge of the frequency-modulated wave as a reference. In this embodiment, however, as will be described later with reference to FIGS. 9A to 9D, a clock is generated with a clock synchronization mark as a reference.

Figure 8:
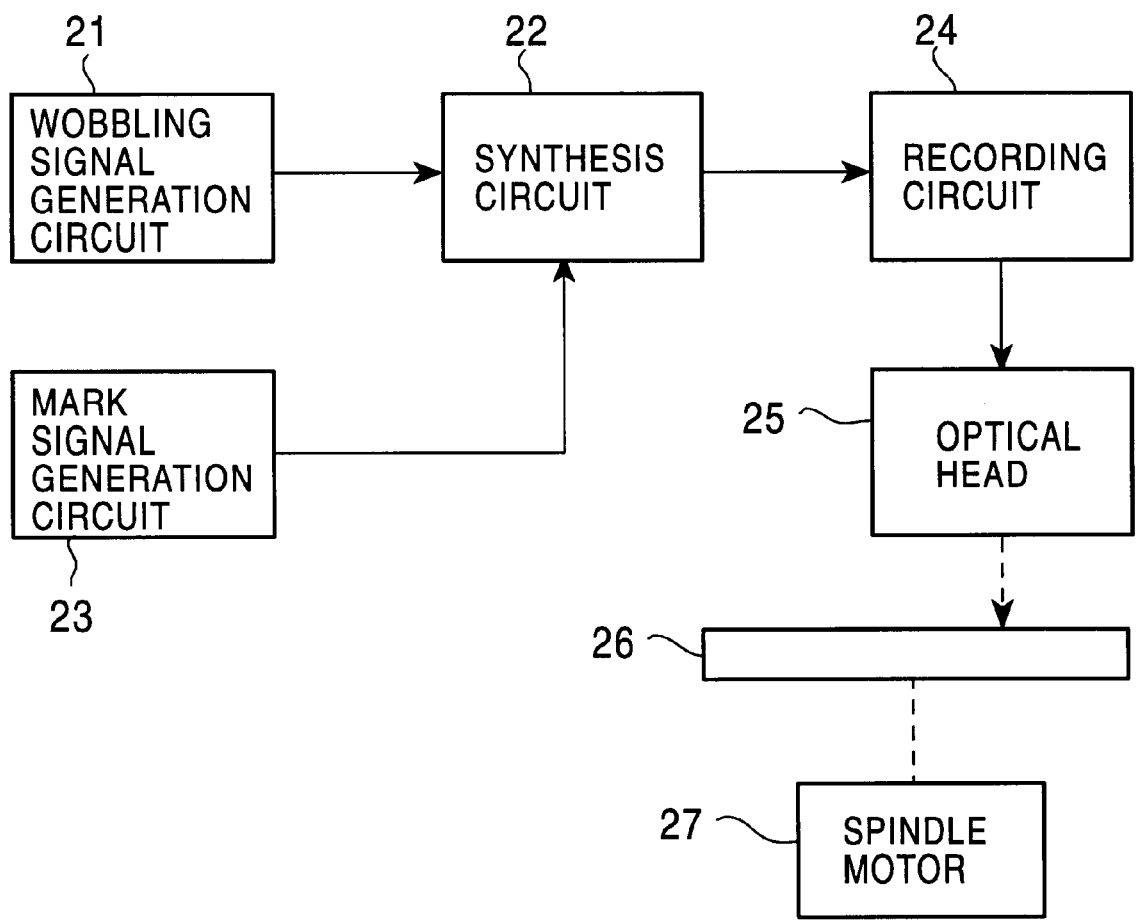
FIG. 8 shows an example of the construction of a recording apparatus for manufacturing a disk 1 having a pre-groove.
Figure 9:
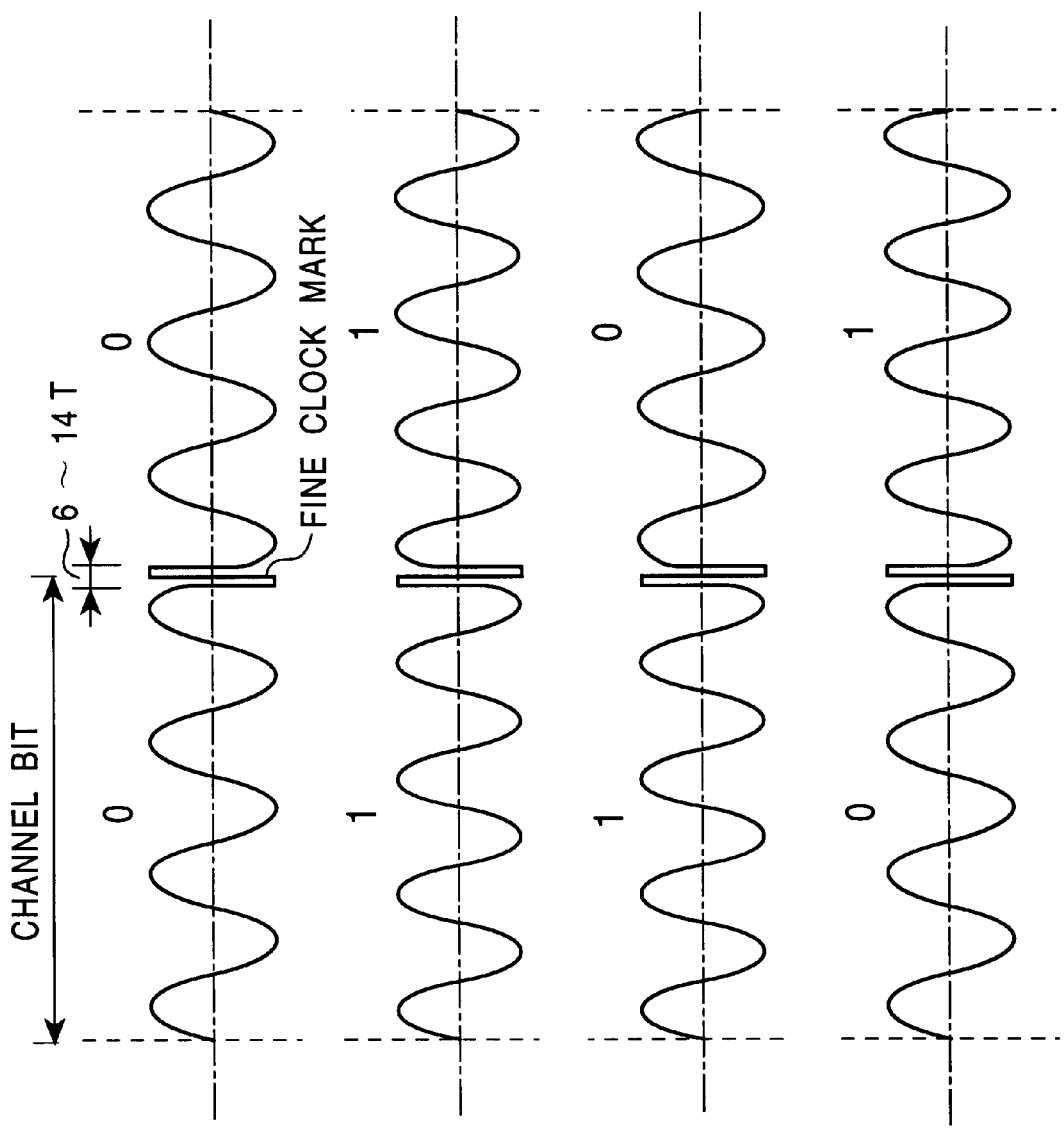
FIGS. 9A, 9B, 9C and 9D show the operation of a synthesis circuit 22 of FIG. 8.

FIG. 8 shows an example of the construction of a recording apparatus (disk formation apparatus) for manufacturing a disk 1 having a pre-groove. A wobbling signal generation circuit 21 has the construction shown in FIG. 3 and supplies a frequency-modulated signal output from the FM modulation circuit 15 to a synthesis circuit 22. A mark signal generation circuit 23 generates a clock synchronization mark signal at a predetermined timing and outputs it to the synthesis circuit 22. The synthesis circuit 22 synthesizes a frequency-modulated signal output from the wobbling signal generation circuit 21 and a clock synchronization mark signal output from the mark signal generation circuit 23 and outputs the result to a recording circuit 24.

When a clock synchronization mark signal is supplied, the synthesis circuit 22 synthesizes the clock synchronization mark (Fine Clock Mark) onto a carrier supplied from the wobbling signal generation circuit 21, as shown in FIGS. 9A to 9D. When modulation of recording and reproduction data is made EFM (Eight to Fourteen Modulation: (8–14) modulation)+for DVD or the like, the clock synchronization mark is made a length from 6 to 14T (T is the length of a bit cell).

That is, as shown in FIGS. 9A to 9D, when the channel bit data is 00 (data 0), 11 (data 0), 10 (data 1) or 01 (data 1), a clock synchronization mark of a frequency higher than the modulation frequency (57.6 kHz) of the address information is synthesized at the zero-cross point of the carrier of the respective data center (the switching point of the channel bits). This clock synchronization mark is recorded on every data bit or every predetermined number of data bits.

Insertion of a clock synchronization mark at the zero-cross point of the wobbling frequency-modulated wave corresponding to the center (switching point of the channel data bits) of the address data bits as described above reduces amplitude variations of the clock synchronization mark, making it easy to detect the clock synchronization mark.

That is, in the FM modulation circuit 15, when the channel data bit is 0, frequency modulation is performed so as to shift the frequency, for example, by −5% from the center frequency, and when the channel data bit is 1, frequency modulation is performed so as to shift the frequency, for example, by +5% from the center frequency, the data bits or the boundary portion of the channel data bits and the zero-cross point of the frequency-modulated wave do not coincide with each other, and thus it is likely to erroneously detect the channel data bits (or the data bits). Further, the insertion position of the clock synchronization mark is not necessarily a zero-cross point and is superimposed onto a point of the frequency-modulated wave having a predetermined amplitude value. As a result, the level of the clock synchronization mark is increased or decreased by an amount corresponding to the amplitude value, and detection of the clock synchronization mark becomes difficult. According to this embodiment, since the clock synchronization mark is always placed at the zero-cross point of the frequency-modulated wave, the detection (identification from the frequency-modulated wave) of the clock synchronization mark is made easy.

The recording circuit 24 controls an optical head 25 in accordance with a signal supplied from the synthesis circuit 22 in order to generate laser light for forming a pre-groove (including a clock synchronization mark) on an original disk 26. A spindle motor 27 causes the original disk 26 to rotate at a fixed angular velocity (CAV).

More specifically, the frequency-modulated wave generated by the wobbling signal generation circuit 21 is synthesized, in the synthesis circuit 22, onto the clock synchronization mark signal output from the mark signal generation circuit 23, and is input to the recording circuit 24. The recording circuit 24 controls the optical head 25 in accordance with the signal input from the synthesis circuit 22 in order to generate laser light. The laser light generated from the optical head 25 is radiated onto the original disk 26 rotated at a fixed angular velocity by the spindle motor 27.

The original disk 26 is developed, a stamper is made from this original disk 26, and disks 1 are formed as a number of replicas from the stamper. This makes it possible to obtain a disk 1 on which a pre-groove 2 having the above-described clock synchronization mark is formed.

Figure 10:
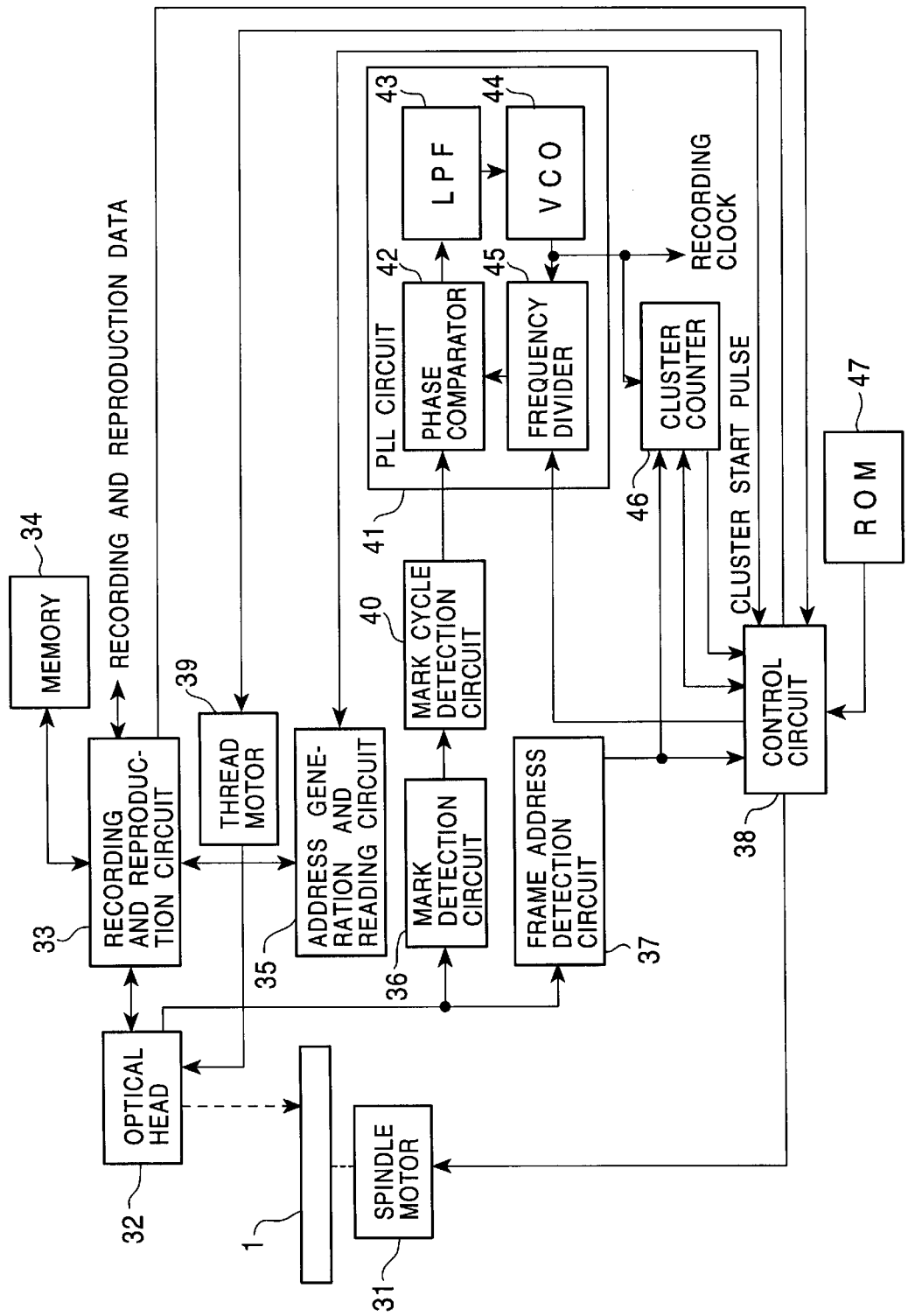
FIG. 10 is a block diagram illustrating an example of the construction of an optical disk recording and reproduction apparatus in which a recording and reproduction apparatus of the present invention is applied.

FIG. 10 shows an example of the construction of an optical disk recording and reproduction apparatus for recording data to or reproducing data from the disk 1 obtained in this way. A spindle motor 31 causes the disk 1 to rotate at a predetermined angular velocity. An optical head 32 (recording means, recording step) radiates laser light onto the disk 1 in order to record data onto the disk 1 and reproduce data from the light reflected therefrom. A recording and reproducing circuit 33 (recording and reproduction unit formation means, recording and reproduction unit formation step, addition means, addition step, second addition means) temporarily stores recording data input from an apparatus (not shown) in a memory 34 (division means, division step), reads one cluster of data when this one cluster of data (or may also be one sector of data), which is a recording unit, is stored in the memory 34, and, for example, modulates the data by a predetermined method and then outputs the modulated data to the optical head 32. Further, the recording and reproducing circuit 33 appropriately demodulates the data input from the optical head 32 and outputs the demodulated data to an apparatus (not shown).

The recording and reproducing circuit 33, as will be described later, adds a front link area and a back link area to the recording data and adds a synchronization signal to these link areas, and then outputs the result.

An address generation and reading circuit 35 (address detection means, address detection step) generates a data address (sector address) (will be described later with reference to FIG. 17) to be recorded within the track (pre-groove 2) under control from a control circuit 38 and outputs the data address to the recording and reproducing circuit 33. The recording and reproducing circuit 33 adds this address to the recording data supplied from the apparatus (not shown) and outputs the data to the optical head 32. Further, when address data is contained within the reproduction data which is reproduced from the tracks of the disk 1 by the optical head 32, the recording and reproducing circuit 33 separates this address data and outputs it to the address generation and reading circuit 35. The address generation and reading circuit 35 outputs the read address to the control circuit 38.

Further, a mark detection circuit 36 detects components corresponding to the clock synchronization mark from an RF signal reproduced and output by the optical head 32. A frame address detection circuit 37 reads address information (the track number and the frame number in FIG. 2) contained in the wobbling signal from the RF signal output from the optical head 32 and supplies the address information to a cluster counter 46 and the control circuit 38.

A mark cycle detection circuit 40 determines the periodicity of detected pulses which are output when the mark detection circuit 36 detects a clock synchronization mark. That is, since the clock synchronization mark is generated at a fixed cycle, a check is made to determine if the detected pulses input from the mark detection circuit 36 are detected pulses generated at this current fixed cycle. If the pulses are detected pulses generated at this fixed cycle, pulses which are synchronized with the detected pulses are generated, and output to a phase comparator 42 of a PLL circuit 41 of a latter stage. Further, in a case in which detected pulses are not input at a fixed cycle, the mark cycle detection circuit 40 generates a pseudo pulse at a predetermined timing so that the PLL circuit 41 of the latter stage does not lock to an incorrect phase.

The PLL circuit 41 has, in addition to the phase comparator 42, a low-pass filter (LPF) 43, a voltage control oscillator (VCO) 44, and a frequency divider 45. The phase comparator 42 compares the phase of an input from the mark cycle detection circuit 40 with that of an input from the frequency divider 45 and outputs a difference between the phases. The low-pass filter 43 smooths the phase difference signal output from the phase comparator 42 and outputs the signal to the VCO 44. The VCO 44 generates a clock with a phase corresponding to the output from the low-pass filter 43 and outputs the clock to the frequency divider 45. The frequency divider 45 frequency-divides the clock input from the VCO 44 by a predetermined value (a value specified by the control circuit 38) and outputs the frequency-divided result to the phase comparator 42.

The clock output from the VCO 44 is supplied to each circuit and also to the cluster counter 46. The cluster counter 46 counts the number of clocks output from the VCO 44 using the frame address supplied from the frame address detection circuit 37 as a reference, generates a cluster start pulse when the counted value reaches a predetermined value (a value corresponding to the length of one cluster) which is set previously, and outputs the value to the control circuit 38.

A thread motor 39, which is controlled by the control circuit 38, transports the optical head 32 to a predetermined track position of the disk 1. Further, the control circuit 38 controls the spindle motor 31 so as to rotate the disk 1 at a predetermined angular velocity (CAV).

A ROM 47 has stored therein, a table which defines the correspondence relationship between track numbers (FIG. 2) in the address frame and zones which separate the data recording areas of the disk 1, and, as required, a table which defines the relationship between zones and a band (the details of which will be described later) to which a zone corresponds.

Figure 11:
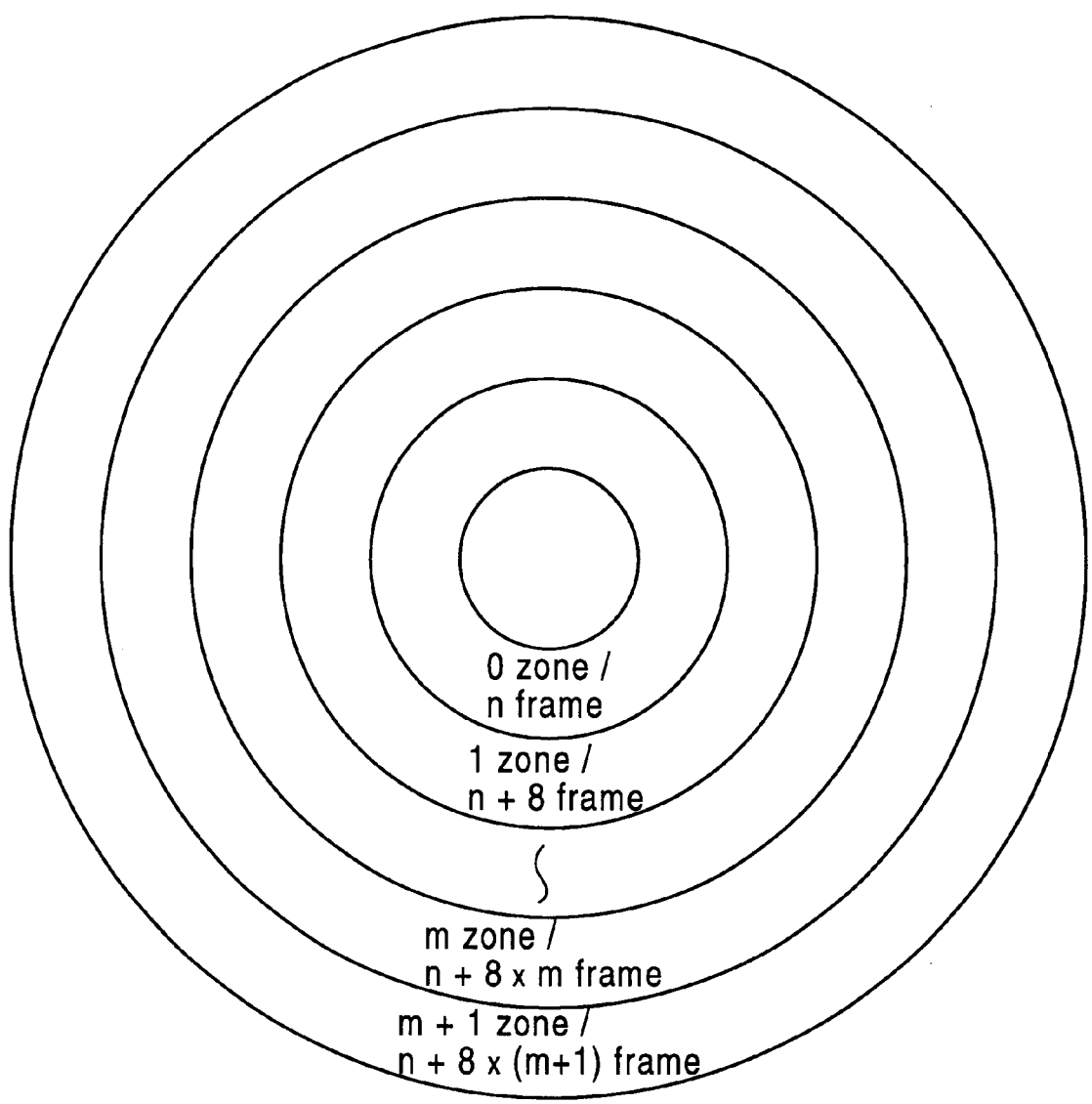
FIG. 11 shows zones in a disk.

More specifically, as in the disk 1 shown in FIG. 11, the control circuit 38 records or reproduces data to and from a plurality of divided zones (in this embodiment, m+2 zones of the 0-th zone to the m+1 zone). When the number of data frames (unlike the address frame described with reference to FIG. 2, this data frame is a unit of blocks of data) per one track of the 0-th zone is set to n, in the next zone, the number of data frames per one track is set to n+8. Hereinafter, in a similar manner, in the zone of a more outer region, the number of data frames increases by 8 than an adjacent zone of the inner region. In the m+1 zone of the outermost region, the number of data frames reaches n+8×(m+1).

A change is made to the 1st zone from the radius position at which a capacity of n+8 frames can be obtained at the same linear density as the innermost-region linear density of the 0-th zone. Hereinafter, in a similar manner, in the m-th zone, the m-th zone is formed from the radius position at which a capacity of n+8×m frames can be obtained at the same linear density as the innermost-region linear density of the 0-th zone.

If, for example, the range in which the radius of the disk 1 is from 24 to 58 mm is made a recording and reproducing area, the track pitch is 0.87 $\mu$m, and the linear density is 0.38 $\mu$m/bit, the recording and reproducing area is divided into 92 zones, as shown in FIGS. 12 to 15. In the 0-th zone in which the disk radius is 24 mm, there are 520 frames per one track (one rotation). As the zone is incremented by 1, there is an increase of 8 frames per one track.

As will be described later, in this embodiment, since one sector is formed of 26 frames (data frames), the number (=8) of frames which is incremented for each zone is set to a value smaller than this number (=26) of frames which constitute one sector. This makes it possible to form zones in smaller units and to increase the capacity of the disk 1. This method is called zone CLD (Constant Linear Density).

In FIGS. 12 to 15, data of each column respectively indicate the zone number, the radius, the number of frames per one track, the number of tracks per one zone, the number (number of clusters) of recording and reproduction units (blocks) per one zone, the minimum linear density within the zone, the capacity of the zone, the rotational velocity of the zone, the minimum linear velocity of the zone, and the maximum linear velocity of the zone. The rotational velocity indicates the number of rotations per minute when the data transfer rate is set at 11.08 Mbps.

In this embodiment, the number of tracks in each zone is fixed to 424. This number of tracks is made the same value as the number (the number of frames of an ECC block) (will be described later with reference to FIG. 20) of frames in one recording and reproduction unit.

Although in this embodiment the number of tracks in each zone is made one times the number of data frames (424 frames) which constitute the recording and reproduction unit, the number may be an integral multiple thereof. This prevents excess data frames from occurring, and an integral number of recording and reproduction units (blocks) are placed in each zone, making it possible to improve zoning efficiency. As a result, it is possible to obtain a capacity which is larger than zone CAV and close to zone CLV, though smaller than zone CLV.

Further, as described above, by performing zoning close to CLV, changes in clock frequency in one zone and the next zone become small. Thus, even when reproduction is performed by a reproduction apparatus exclusively used for CLV, extraction of a clock is made possible from zone to zone where the clock frequency changes, and thus reproduction can be made continuously from zone to zone.

Next, the operation of the embodiment shown in FIG. 10 will be described. Here, the operation during recording of data will be described. The optical head 32 radiates laser light onto the optical disk 1 and outputs an RF signal obtained from the light reflected therefrom. The frame address detection circuit 37 reads wobbling information (address information) from the RF signal, and outputs the read result to the control circuit 38 and also to the cluster counter 46. Further, this wobbling information is input to the mark detecting circuit 36 whereby a clock synchronization mark is detected and supplied to the mark cycle detection circuit 40.

The mark cycle detection circuit 40 determines the periodicity of the clock synchronization mark, generates a predetermined pulse corresponding thereto, and outputs the pulse to the PLL circuit 41. The PLL circuit 41 generates a clock (recording clock) which is synchronized with this pulse and supplies the clock to the cluster counter 46.

The control circuit 38 is capable of detecting the position of a reference clock synchronization mark in one track (one rotation) from the frame address (frame number) supplied from the frame address detection circuit 37. For example, with the clock synchronization mark detected at the beginning of a frame (address frame) of frame number 0 as a reference, it becomes possible to access any desired position (any desired position during one rotation) on the track on the basis of the count value of the recording clock.

Figure 16:
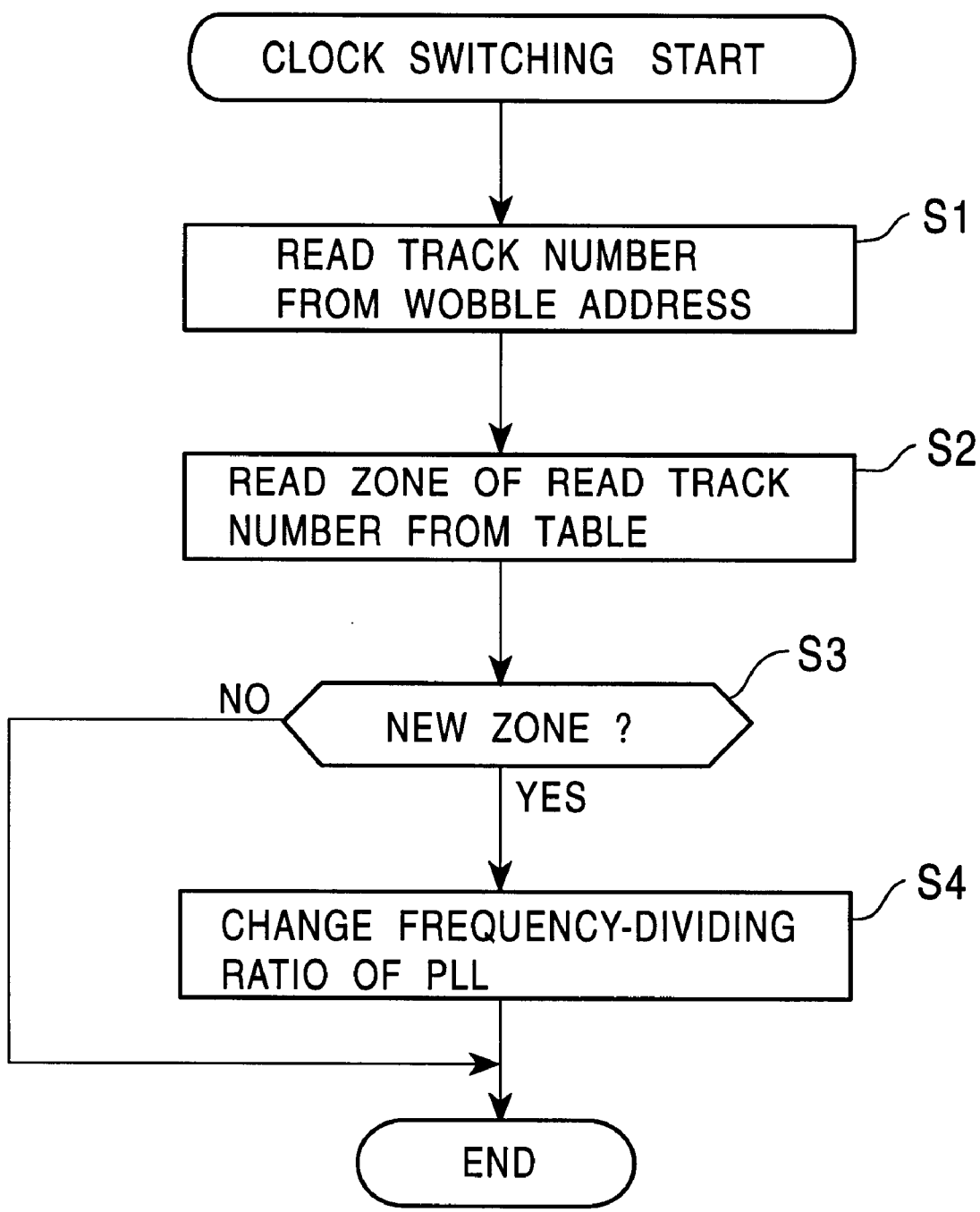
FIG. 16 is a flowchart illustrating a clock switching process in the embodiment in FIG. 10.

In the above-described way, when an access to any desired position on the track is made, it is further necessary to determine to which zone that access point belongs and to cause the VCO 44 to generate a clock of a frequency corresponding to the zone. Therefore, the control circuit 38 further performs a clock switching process such as that shown in the flowchart of FIG. 16.

More specifically, initially, in step S1, the control circuit 38 reads the track number from the frame address of the access point output from the frame address detection circuit 37. Then, in step S2, a zone corresponding to the track number read in step S1 is read from the table stored in the ROM 47. As described above, the table in the ROM 47 has prestored therein information on to which of the 0-th to 92-th zones the track of each number belongs.

Therefore, in step S3, a check is made to determine if the track number just read indicates a new zone different from the zone which has been accessed up until then. When it is determined that the zone is a new zone, the process proceeds to step S4 where the control circuit 38 controls the frequency divider 45 in order to set a frequency-dividing ratio corresponding to the new zone. As a result, a recording clock of a frequency different for each zone is output from the VCO 44.

Meanwhile, when it is determined in step S3 that the current zone is not a new zone, the process in step 4 is skipped. That is, the frequency-dividing ratio is kept as it is without being changed.

Next, the format of recording data will be described. In this embodiment, as described above, data is recorded in units of one cluster (32 kilobytes), and this cluster is structured as described below.

Figure 17:
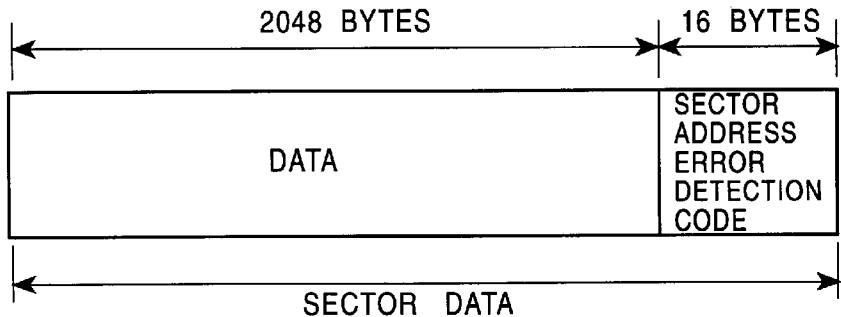
FIG. 17 shows the format of data for one sector.

That is, data of 2 kilobytes (2048 bytes) is extracted as data for one sector, and an overhead of 16 bytes is added thereto as shown in FIG. 17. This overhead contains a sector address (address generated or read by the address generation and reading circuit 35 in FIG. 10) and an error detection code for error detection.

Figure 18:
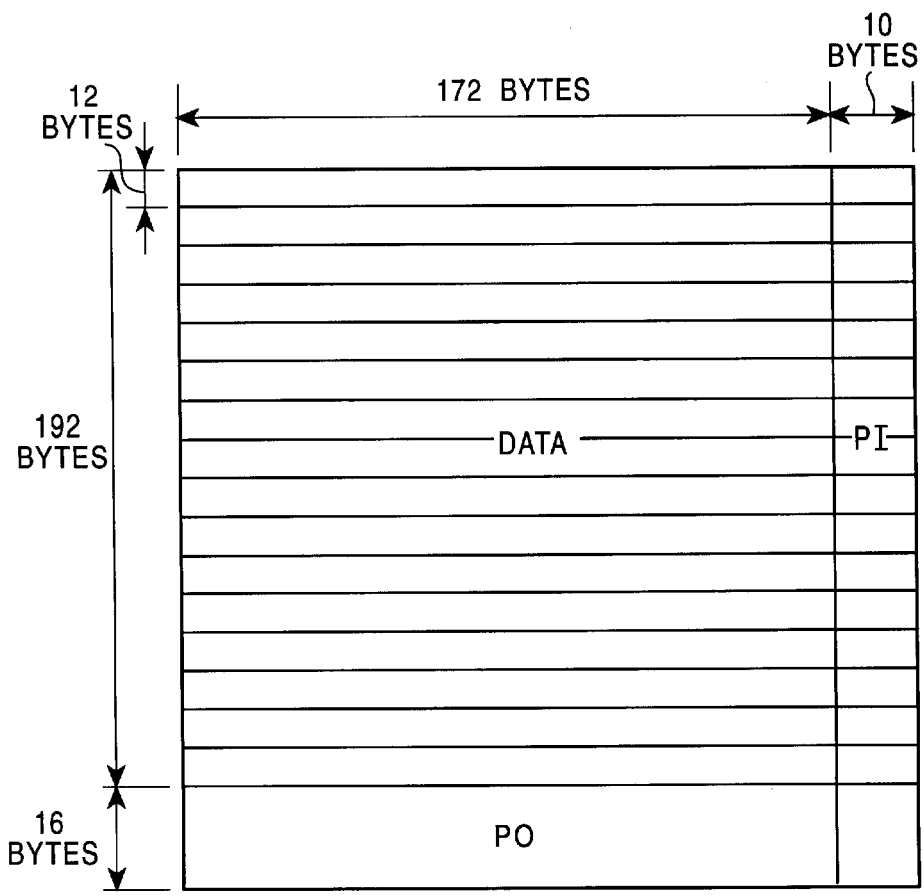
FIG. 18 shows the structure of data of 32 kilobytes.

This data of a total of 2064 (2048+16) bytes is formed into data of 12×172 (=2064) bytes, as shown in FIG. 18. Then, 16 of these data for one sector are collected and formed into data of 192 (=12×16)×172 bytes. For this data of 192×172 bytes, a 10-byte inner code (PI) and a 16-byte outer code (PO) are added as parities to each byte in the horizontal and vertical directions.

Figure 19:
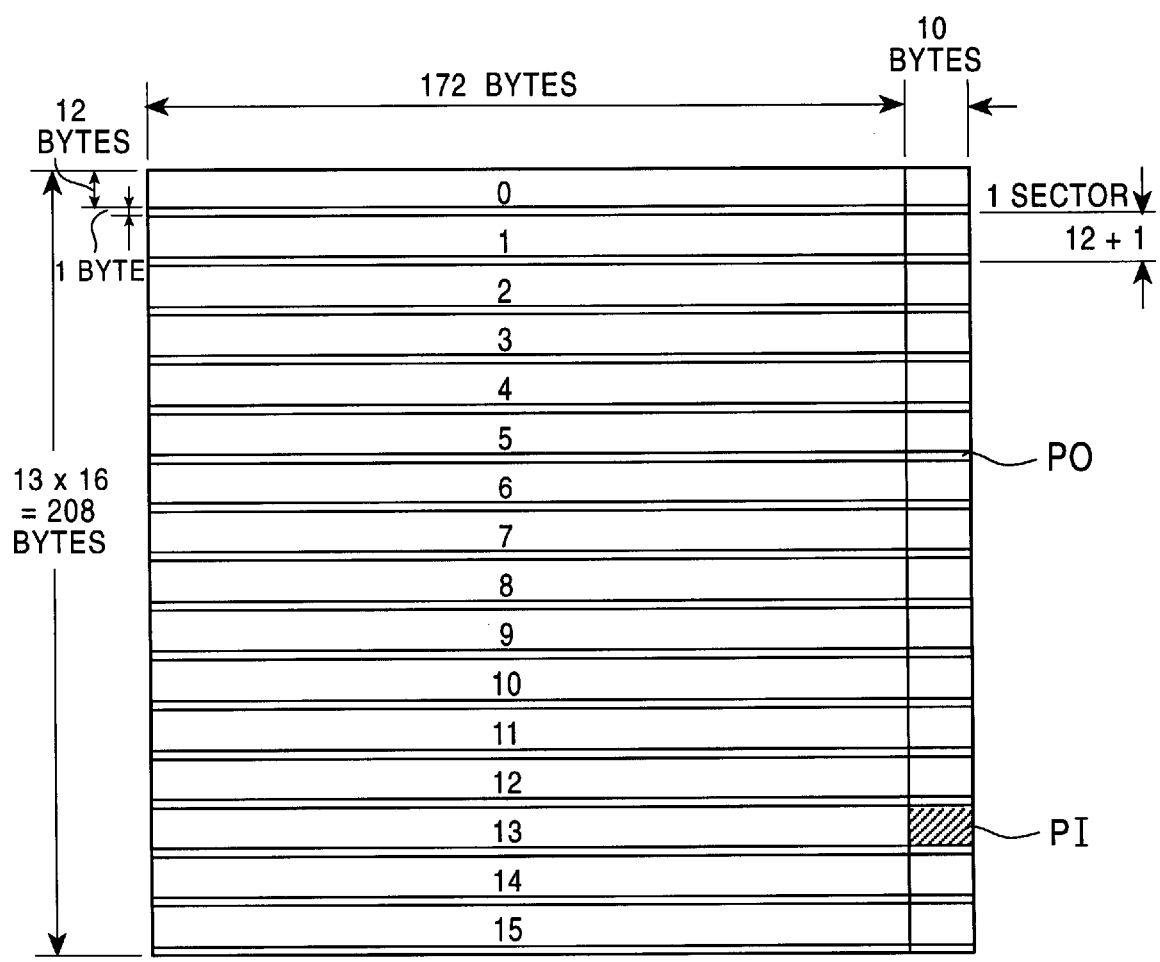
FIG. 19 shows a state in which an outer code of FIG. 18 is interleaved.

Further, of the data which is blocked to 208 (=192+16)× 182 (=172+10) bytes, the outer code (PO) of the 16×182 bytes is divided into 16 data of 1×182 bytes. As shown in FIG. 19, the data is added one at a time to below the 16 sector data of number 0 to number 15 of 12×182 bytes and is interleaved. Then, data of 13 (=12+1)×182 bytes is assumed to be data of one sector.

Figure 20:
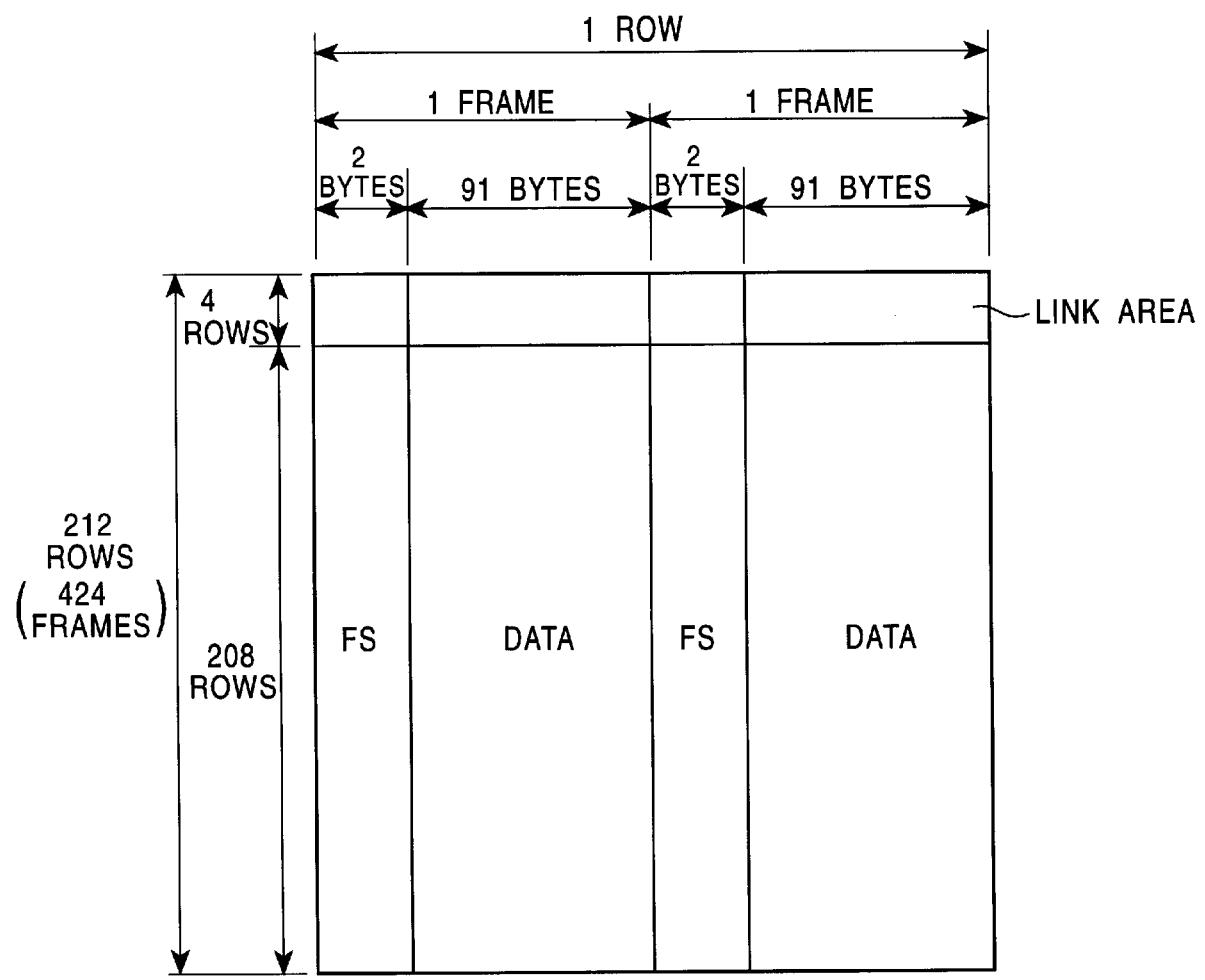
FIG. 20 shows the structure of data of 32-kilobyte blocks.

Further, data of 208×182 bytes shown in FIG. 19, as shown in FIG. 20, is divided into two parts in the vertical direction, one frame is formed into data of 91 bytes, and thus the data is formed into data of 208×2 frames. Then, link data (data of the link area) of 4×2 frames is added (more precisely, as will be described later with reference to FIG. 23, a part of data for 8 frames is recorded onto the start of the cluster, and the remainder is recorded onto the end of the cluster) to the head of this data of 208×2 frames. A 2-byte frame synchronization signal (FS) is further added to the head of the 91-byte frame data. As a result, as shown in FIG. 20, data of one frame becomes data of a total of 93 bytes, and becomes data of blocks of a total of 212 (=208+4)×(93×2) bytes (424 frames). This becomes data for one cluster (blocks as a recording unit). The size of the real data section such that the overhead portion is excluded becomes 32 kilobytes (=2048×16/1024 kilobytes).

That is, in this embodiment, one cluster is formed of 16 sectors and one sector is formed of 26 frames.

Figure 21:
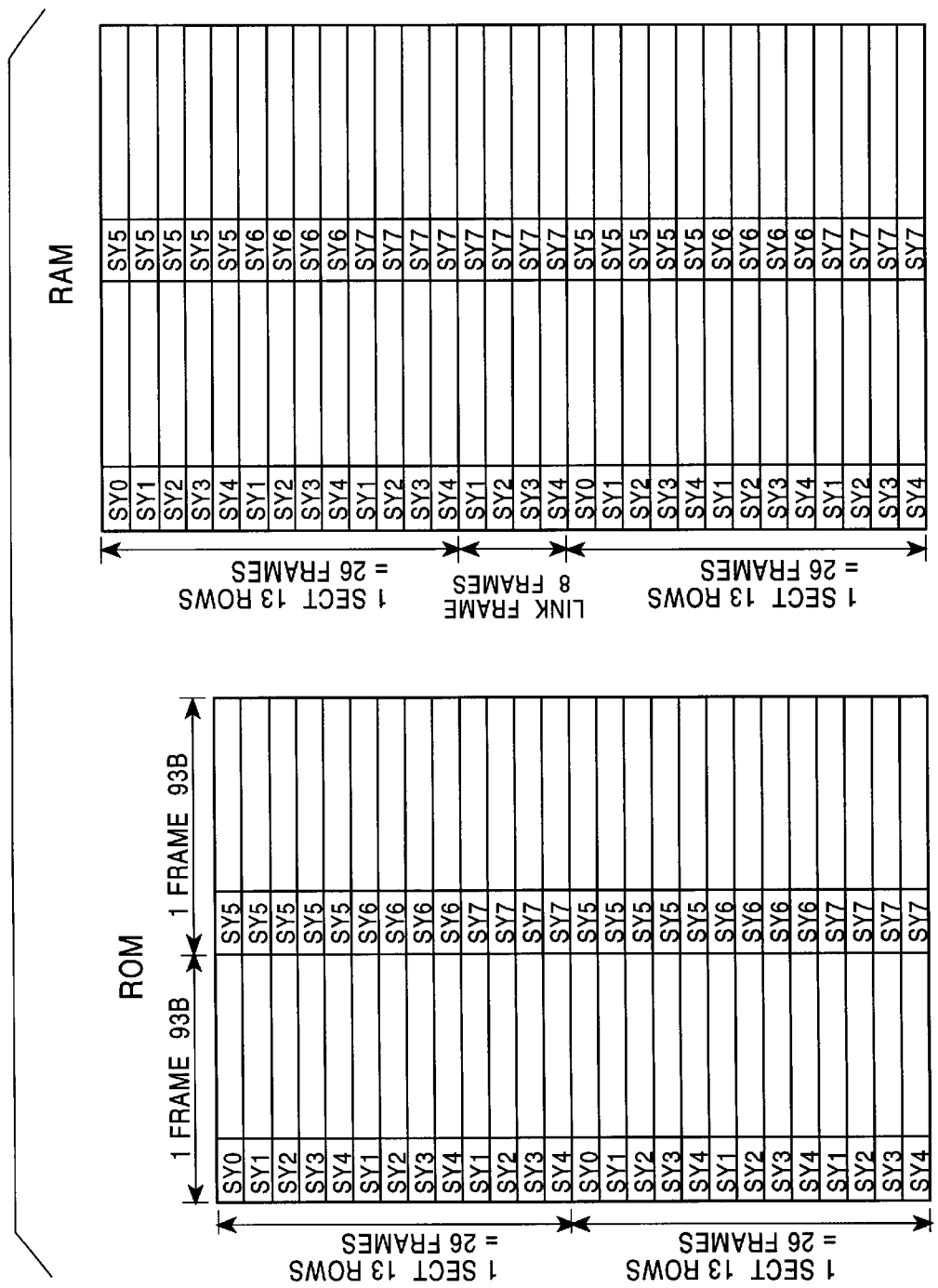
FIG. 21 shows the frames of a ROM disk and a RAM disk and an example of the structure of a frame synchronization signal.

FIG. 21 shows each frame of a ROM disk (read-only disk) and a RAM disk (rewritable-type disk), and the structure of a frame synchronization signal. In the ROM disk, one sector is formed of 13 rows of data, i.e., 26 frames. Further, frame synchronization signals SY0 to SY7 are added to the head of each frame.

Further, in the case of the RAM disk, a link area of 8 frames is added followed by 13 rows of data, i.e., data of 26 frames, and then data of 26 frames is added. The structures of the frame synchronization signal of the data area of the RAM disk and the frame synchronization signal of the data area of the ROM disk are the same. In addition, the frame synchronization signal of the link area of the RAM disk is formed the same as the end portion of the frame synchronization signal of the data area. That is, SY1 to SY4 and SY7 of the link area are the same patterns as the 10-th to 13-th rows of the data area. With such a construction, it becomes possible to reproduce a RAM disk by a reproduction apparatus exclusively used for ROM disks.

More specifically, a reproduction apparatus exclusively used for ROM disks is formed in such a way that, when 8 frame synchronization signals SY1, SY7, SY2, SY7, SY3, SY7, SY4, and SY7 stored in the 10-th to 13-th rows of the data blocks are detected, the reproduction apparatus recognizes the next data to be the beginning portion of a data block. Therefore, by storing these 8 frame synchronization signals in the link area, it is possible to cause the reproduction apparatus to recognize the beginning portion of the data area which follows the link area.

FIG. 22 shows an example of the frame synchronization signals SY0 to SY7 shown in FIG. 21. Although a frame synchronization signal is 2-byte data, in this embodiment, data after conversion is shown in the channel bit data; therefore, the data length of each frame synchronization signal is 32 bits (4 bytes). For example, there are four types of states 1 to 4 in SY0. When the signal is added to frame data (see FIG. 20) of 91 bytes, data of a state in which a DSV (Digital Sum Value) reaches a minimum is selected and is added as a frame synchronization signal.

Figure 23:
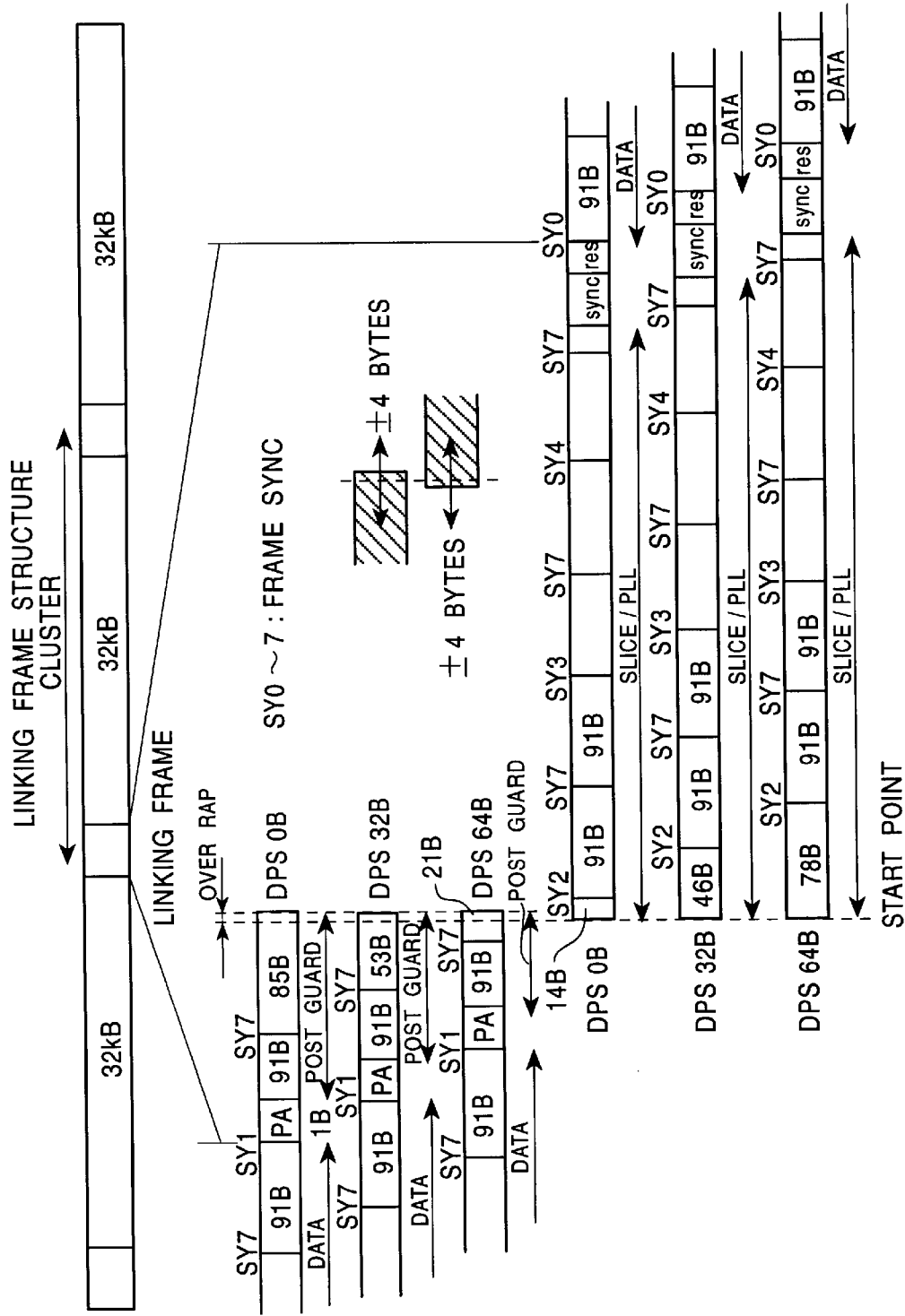
FIG. 23 shows an example of the structure of a link area.

Since such data is recorded on the disk 1 in cluster units, a link area is formed between clusters, as shown in FIG. 23.

As shown in FIG. 23, a link area (Linking Frame) is formed of 8 frames and is inserted between data blocks of 32 kilobytes. Each RW unit (recording and reproduction unit) is formed of: slice/PLL data which is a front link area of a 32-kilobyte data block or link data, such as frame synchronization signals SY1 to SY7; a 32-kilobyte data block; a postamble which is a back link area of the 32-kilobyte data block; and a postguard.

A slice is data for setting the time constant for binarizing reproduction data, and a PLL is data for reproducing a clock. Regarding the frame synchronization signals SY1 to SY7, any of state 1 to state 4 is selected and added thereto, as described above with reference to FIG. 22.

Data for adjusting the mark length of the last data and for returning the signal polarity is recorded in the postamble. The postguard is an area for absorbing recording jitter which occurs in response to decentering of the disk, recording sensitivity of the disk and the like. Further, the postguard prevents data from mutually interfering in the link area adjoining a link area to be recorded next even when the data recording start position is changed as will be described later. Furthermore, the postguard is recorded in such a manner as to overlap the next data by 8 bytes when there is no jitter and when a DPS (Data Position Shift) to be described later is 0 bytes.

The synchronization signal (sync), which is 4-byte data, is a signal for synchronization. Further, the last 4 bytes are reserved for future use.

In each RW unit (recording and reproduction unit), recording of information is started from the start point (Start Point), and recording is terminated when excess (overlap) of 8 bytes from the start point occurs. Further, during recording, the recording and reproducing circuit 33 randomly selects any one of the values of 0 to 64 bytes and changes the recording position of the data of the link area and the 32-kilobyte data block data on the basis of the value of the selected DPS.

As shown in an exploded view in FIG. 23, when, for example, 0 bytes are selected as the DPS, a 14-byte link data is added before the first frame synchronization signal SY2 of the front link area, and 85-byte link data is added after the final frame synchronization signal SY7 of the back link area.

Further, when 32 bytes are selected as the DPS, a 46-byte link data is added before the first frame synchronization signal SY2 of the front link area, and a 53-byte link data is added after the final frame synchronization signal SY7 of the back link area.

In addition, when 64 bytes are selected as the DPS, 78-byte link data is added before the first frame synchronization signal SY2 of the front link area, and 21-byte link data is added after the final frame synchronization signal SY7 of the back link area.

As described above, on the basis of the value of the DPS selected by the recording and reproducing circuit 33, the positions at which the link data and the 32-kilobyte data blocks are recorded vary. Therefore, during recording on a phase-change disk, it is possible to prevent the same data (e.g., a frame synchronization signal, etc.) from being repeatedly recorded on the same portion of a disk. Further, in such a case, since the start point is fixed, it is possible to generate a recording timing in a manner similar to that done conventionally.

Figure 24:
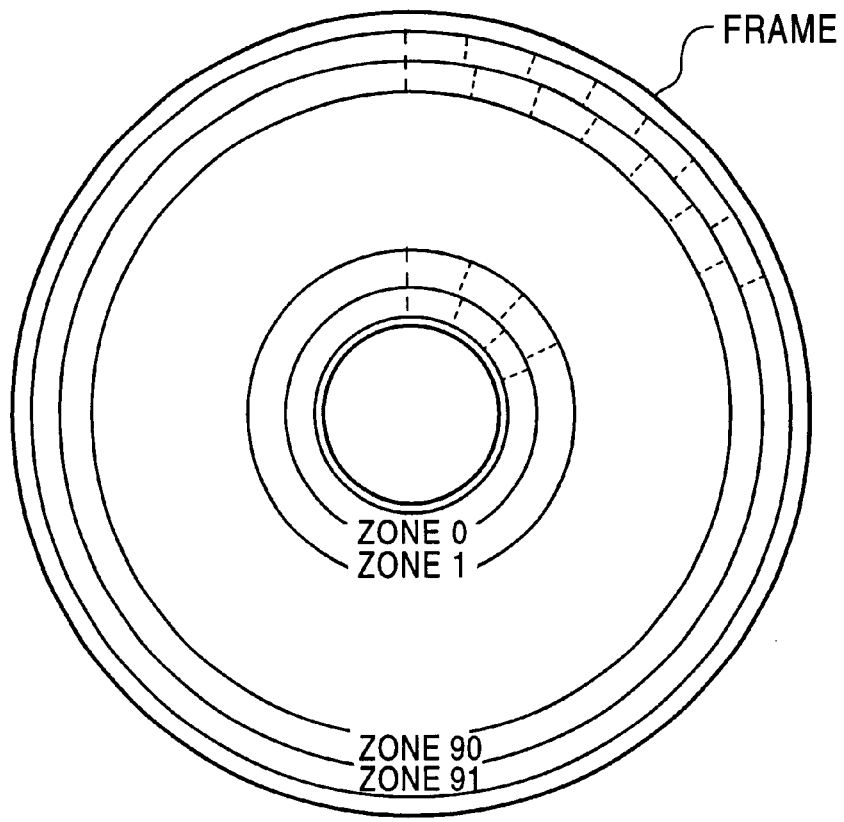
FIG. 24 shows a state in which a disk is divided into 92 zones.

FIG. 24 is a schematic representation of the disk 1 divided into 92 zones in the above-described way as shown in FIGS. 12 to 15. Although in the above-described embodiment, in any zone of the respective 92 zones, the disk 1 is driven at a fixed (same) angular velocity in all of these 92 zones, it is also possible to form bands over a plurality of zones and to drive the disk 1 at an angular velocity different for each band though driven at a fixed angular velocity within the band.

Figure 25:
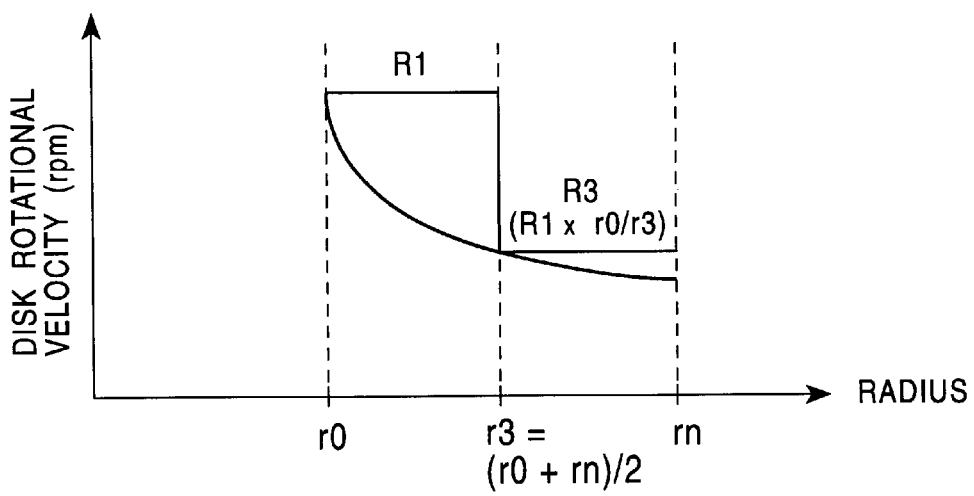
FIG. 25 shows a disk rotational velocity when the disk is divided into two bands.
Figure 26:
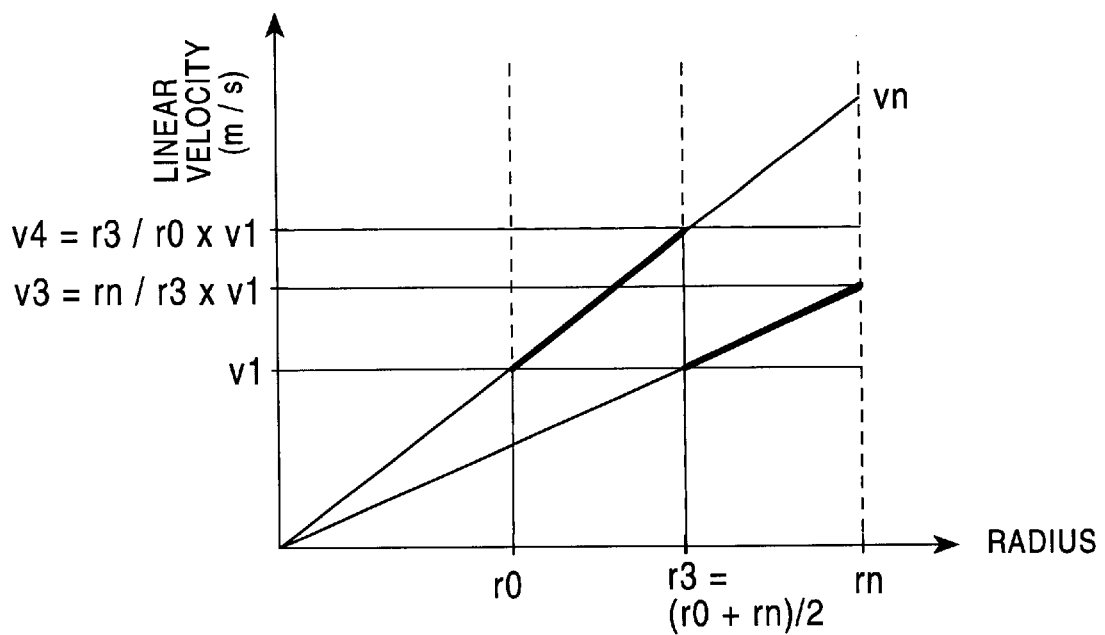
FIG. 26 shows a linear velocity when the disk is divided into two bands.

For example, as shown in FIGS. 25 and 26, when the range from the radius r0 of the innermost region to the radius rn of the outermost region is an area in which data is recorded and reproduced, the area is divided at the intermediate radius r3 (=(r0+rn)/2). That is, the area is divided into bands of radius r0 to radius r3 and bands of radius r3 to radius rn. Within each band, it is assumed that the disk 1 is rotated at a predetermined angular velocity. When the angular velocity (rotational velocity) at radius r0 is denoted as R1, an angular velocity R3 at radius r3 can be determined from the following equation since the angular velocity is inversely proportional to the radius:

$$R3=R1\times(r0/r3)$$

Further, as shown in FIG. 26, when a linear velocity at radius r0 is denoted as v1, a linear velocity v4 can be determined from the following equation since the linear velocity at radius r3 within the first band is inversely proportional to the radius:

$$v4=(r3/r0)\times v1$$

Further, since the linear velocity at radius r3 in the next band is v1, a linear velocity v3 at radius rn can be determined from the following equation:

$$v3=(rn/r3)\times v1$$

If the area is divided into bands in this way, since it is possible to make the rotational velocity slow in the case of the bands from radius r3 to radius rn than in the case of the bands from radius r0 to radius r3, it is possible to increase the recording capacity more than in the case of the normal zone CAV method.

In the embodiment in FIGS. 25 and 26, the band is divided at the intermediate radius r3 of the radius r0 of the innermost region and the radius Rn of the outermost region. As a result, the widths of the changes in the linear velocity of the two bands are different.

Figure 27:
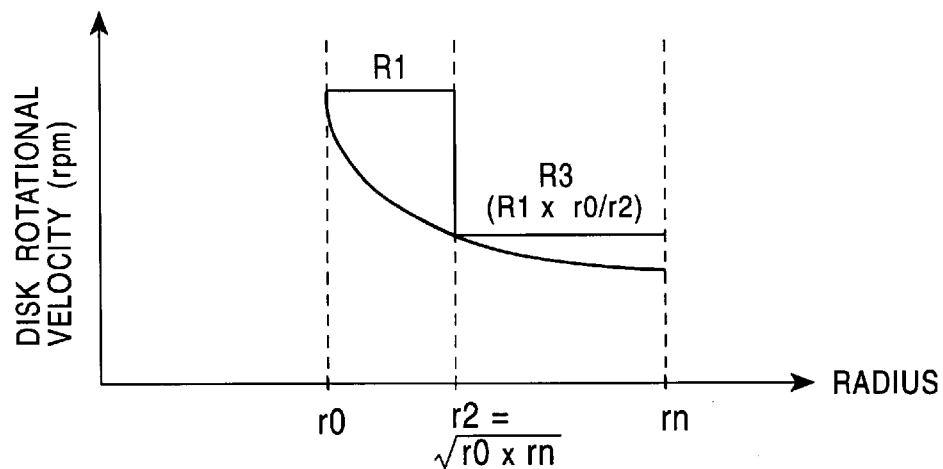
FIG. 27 shows a disk rotational velocity when the disk is divided into two bands.
Figure 28:
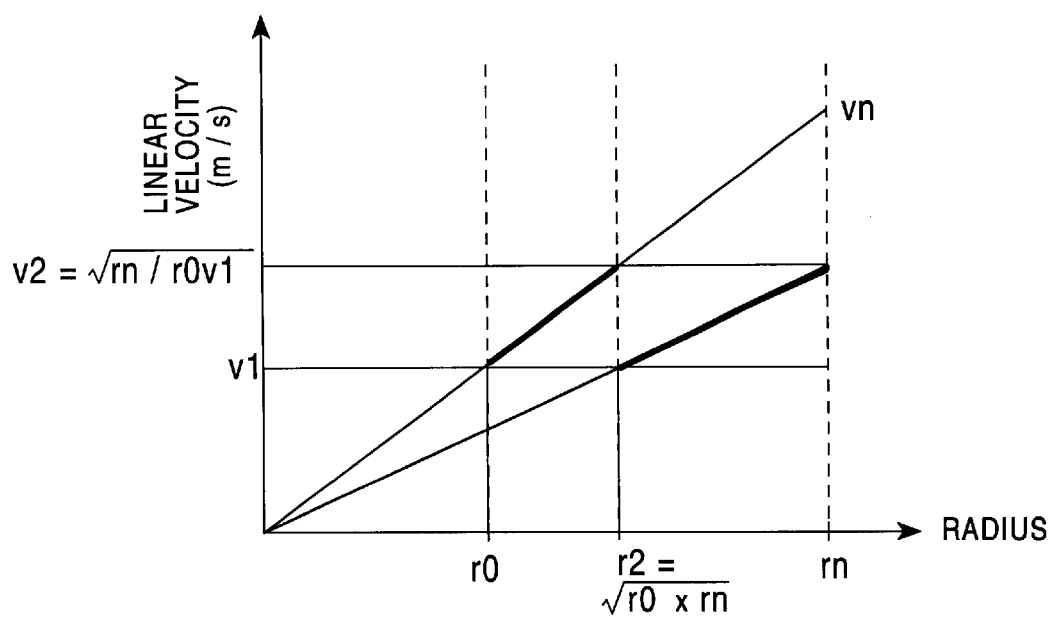
FIG. 28 shows a linear velocity when the disk is divided into two bands.

Thus, as shown, for example, in FIGS. 27 and 28, the widths of changes in the linear velocity in the two bands can also be made the same.

More specifically, in this case, if the radius which divides the band is denoted as r2 and the linear velocity at the termination point of each band as v2, the following equations can be obtained from the relationship between the linear velocities:

$$v1/r0=v2/r2$$

$$v1/r2=v2/rn$$

Therefore, the following equations can be obtained from the above-described equations:

$$r2=(r0\times rn)^{1/2}$$

$$v2=(rn/r0)^{1/2}\times v1$$

Further, if the rotational velocity in the bands from radius r0 to radius r2 is denoted as R1 and the rotational velocity from radius r2 to radius rn as R2, R2 can be determined from the following equation:

$$R2=R1(r0/r2)=(r0/rn)^{1/2}\times R1$$

As described above, if an area is divided into two bands at radius r2, the widths of the changes in the linear velocity in each band can be made the same.

Figure 29:
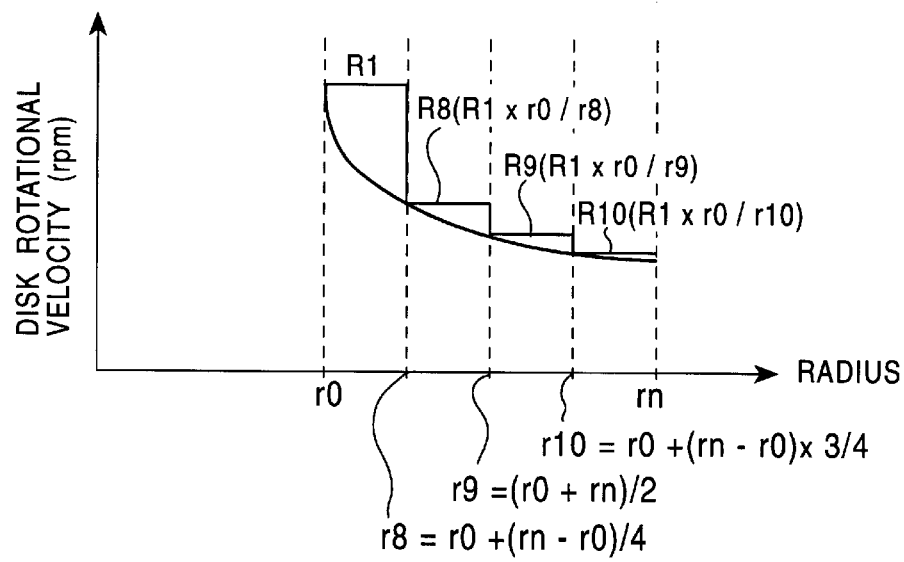
FIG. 29 shows a disk rotational velocity when the disk is divided into four bands.
Figure 30:
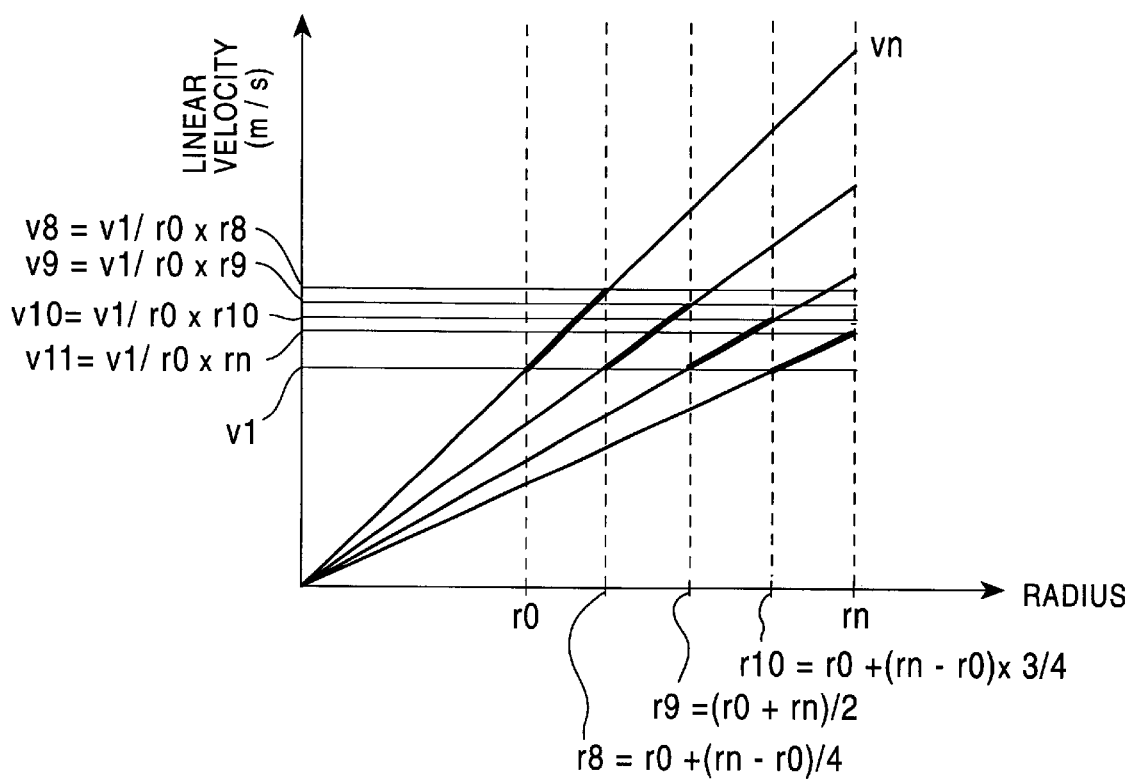
FIG. 30 shows a linear velocity when the disk is divided into four bands.
Figure 31:
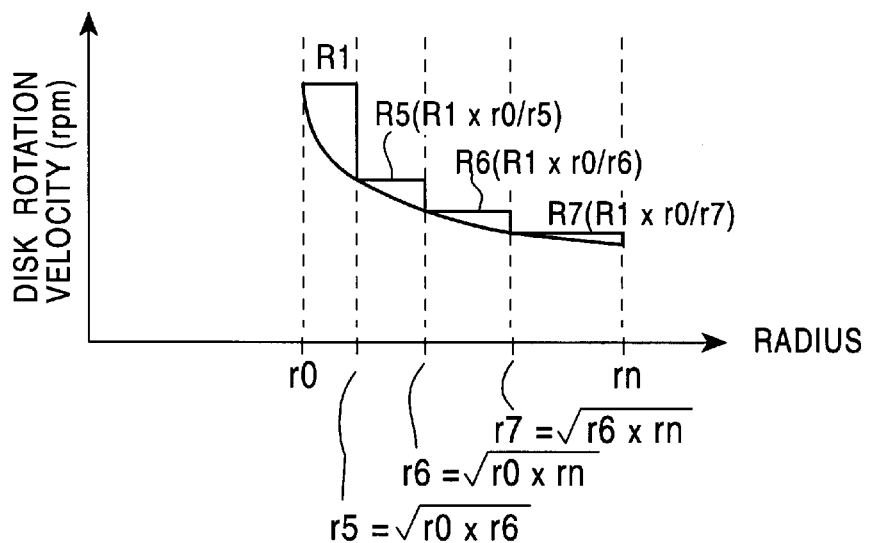
FIG. 31 shows a disk rotational velocity when the disk is divided into four bands.
Figure 32:
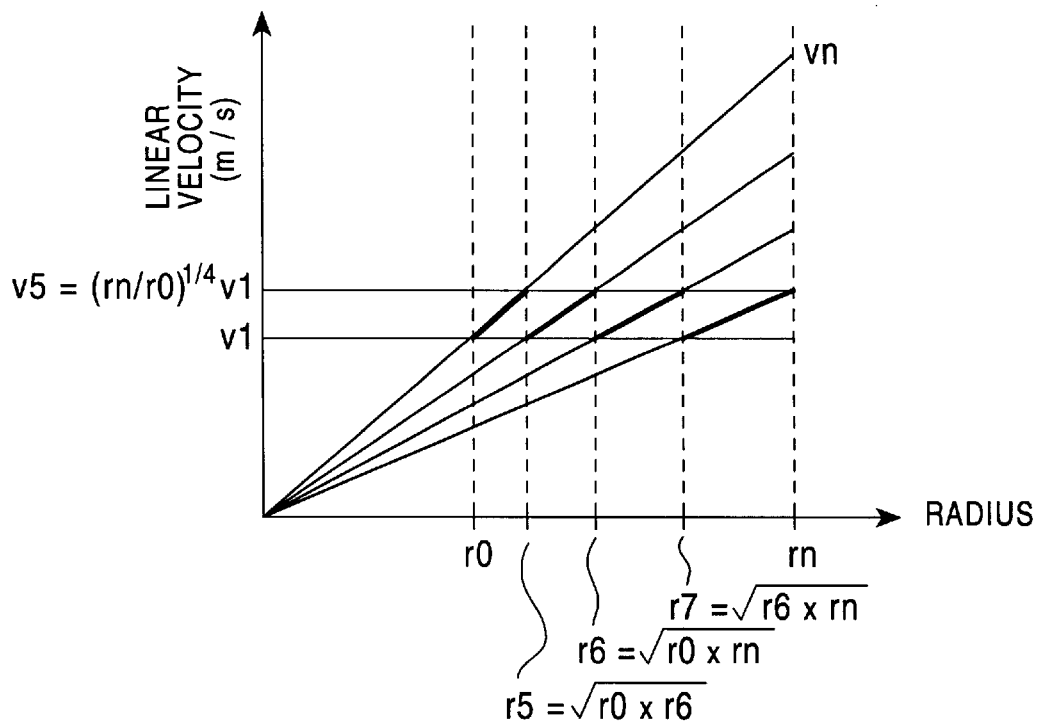
FIG. 32 shows a linear velocity when the disk is divided into four bands.

Although in the above-described embodiment the number of bands is 2, the number may also be 4. FIGS. 29 and 30, in correspondence with FIGS. 25 and 26, show a case in which bands are formed by equally dividing the range of radiuses r0 to Rn into 4 at radiuses r8, r9 and r10. FIGS. 31 and 32, in correspondence with FIGS. 27 and 28, show a case in which a band is divided at radiuses r5, r6 and r7 so that the widths of changes in the linear velocity in each band become the same.

That is, in the embodiment shown in FIGS. 29 and 30, since the range from radiuses r0 to Rn is equally divided into 4 at radiuses r8, r9 and r10, each radius is expressed by the following equations:

$$r8=r0+(rn-r0)/4$$

$$r9=(r0+rn)/2$$

$$r10=r0+(3/4)(rn-r0)$$

Also, the rotational velocities R8, R9 and R10 of each band are expressed by the following equations, respectively:

$$R8=R1\times(r0/r8)$$

$$R9=R1\times(r0/r9)$$

$$R10=R1\times(r0/r10)$$

Further, the linear velocities v8, v9, v10 and v11 at the termination points of each band of radiuses r8, r9, r10 and rn can be determined by the following equations, respectively:

$$v8=(v1/r0)\times r8$$

$$v9=(v1/r0)\times r9$$

$$v10=(v1/r0)\times r10$$

$$v11=(v1/r0)\times rn$$

On the other hand, in the embodiment in FIGS. 31 and 32, the rotational velocities R5, R6 and R7 at radiuses r5 to r6, radiuses r6 to r7, and radiuses r7 to rn can be determined by the following equations, respectively:

$$R5=R1\times(r0/r5)$$

$$R6=R1\times(r0/r6)$$

$$R7=R1\times(r0/r7)$$

Further, as shown in FIG. 32, when the linear velocity at radiuses r5, r6, r7, and rn of the termination points of each band is denoted as v5, the following equation is satisfied:

$$v1/v5=r0/r5=r5/r6=r6/r7=r7/rn$$

Therefore, the following equations are obtained:

$$r5=(r0\times r6)^{1/2}$$

$$r6=(r0\times rn)^{1/2}$$

$$r7=(r6\times rn)^{1/2}$$

Further, the linear velocity v5 at each radius r5, r6, r7 and rn can be determined from the following equation:

$$v5=(r5/r0)v1=(r0\times r6)^{1/2}(v1/r0)=(r6/r0)^{1/2}v1=((r0\times rn)^{1/2}/r0)^{1/2}v1=(rn/r0)^{1/4}v1$$

In the case of normal CAV disks, since the linear velocity at the position of radius Rn is vn, the change width consequently becomes vn−v1. In comparison, in the embodiment shown in FIGS. 31 and 32, it is possible to suppress the above change width to a change width (change width of ¼ or less of (vn−v1)) of v5−v1.

Figure 33:
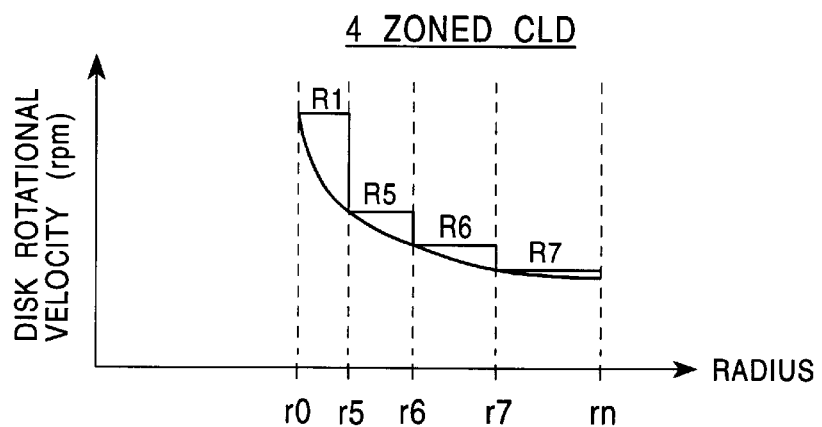
FIG. 33 shows a disk rotational velocity when the disk is divided into four bands.
Figure 34:
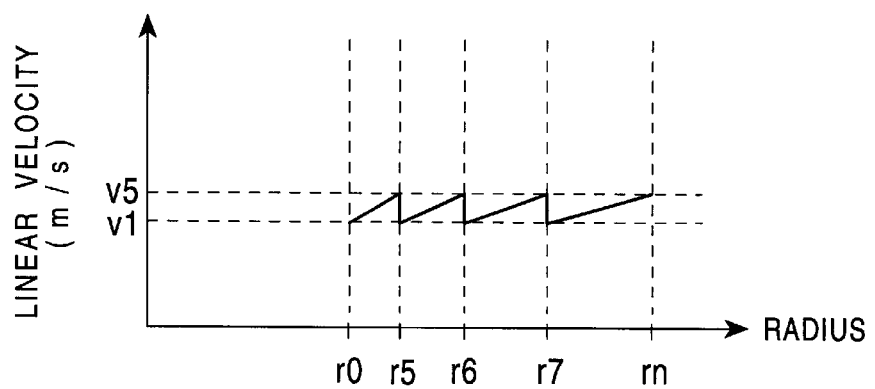
FIG. 34 shows a linear velocity when the disk is divided into four bands.
Figure 35:
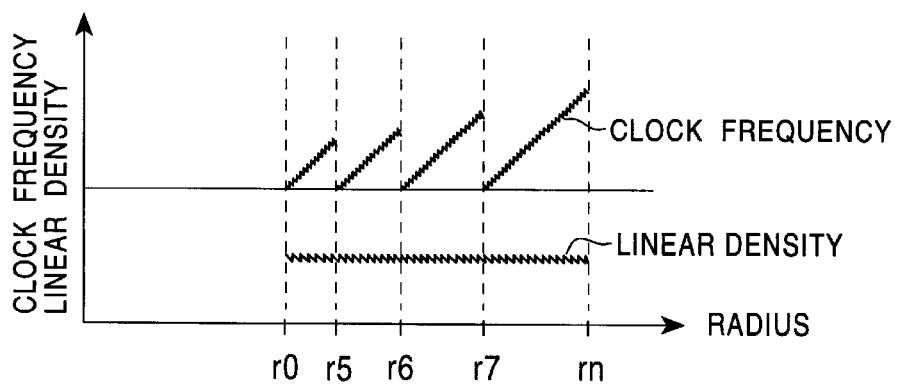
FIG. 35 shows a linear velocity and a clock frequency when the disk is divided into four bands.

As described above, when the range of radii r0 to Rn is divided into 4 bands at radii r5, r6 and r7 so that the change in width of the linear velocity becomes fixed, the rotational velocity of the disk, the linear velocity, as well as the linear density and the clock frequency, each vary as shown in FIGS. 33 to 35.

That is, in the bands from radii r0 to r5, the rotational velocity is set to R1. In the bands from radii r5 to r6, the rotational velocity is set to R5. In the bands from radii r6 to r7, the rotational velocity is set to R6. In the bands from radii r7 to rn, the rotational velocity is set to R7. Then, as shown in FIG. 34, in each band the linear velocity increases from v1 up to v5 from the innermost region toward the outermost region; however, the change in width in each band is fixed.

Further, as shown in FIG. 35, the clock frequency is fixed within each zone as described above, but the clock frequency is switched for each zone, and in each band, the clock frequency increases more sequentially in the zones of the outer regions than in the zones of the inner regions. The clock frequencies at the beginning points of each band at radii r0, r5, r6 and r7 are the same; however, since the widths (number of tracks) of each band differ, the value of the clock frequency at the termination point of each band is greater in the case of the bands of a more outer region.

Further, in each zone, the linear density is smaller in the outer regions than in the inner regions; in every zone of every band, the change in width is fixed.

Figure 36:
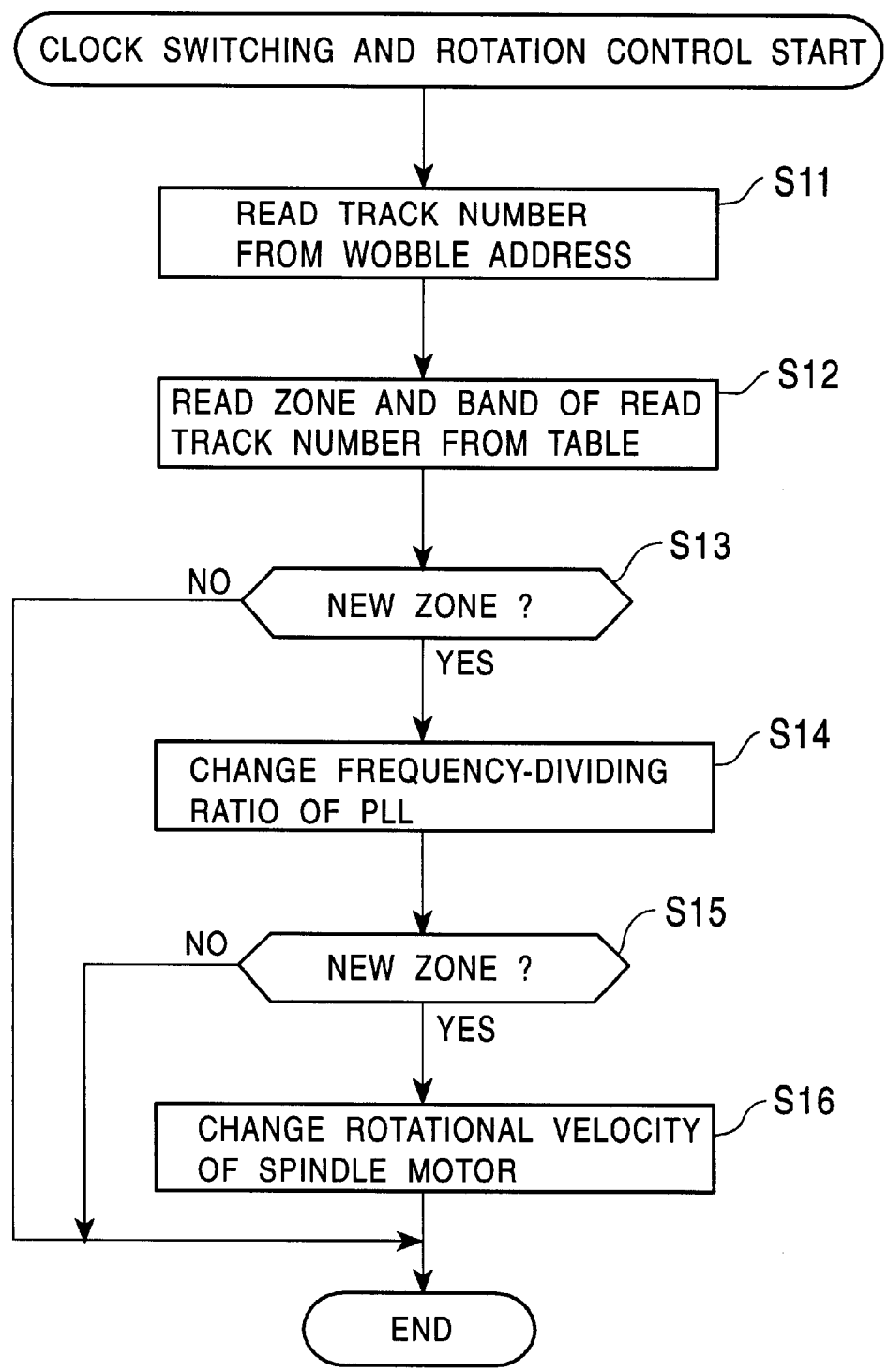
FIG. 36 is a flowchart illustrating clock switching and rotation control processes when a band is divided.

As described above, in a case in which a plurality of zones are collectively divided into a plurality of bands, the control circuit 38 performs clock switching and rotation control processes shown in FIG. 36. The process from steps S11 to S14 is basically similar to the process from steps S1 to S4 in FIG. 16. That is, in step S11, when a track number is read from the wobble address, in step S12 the zone and the band of the read track number are read from the ROM 47. Then, a check is made in step S13 to determine if the zone of the read track number is a new zone. When it is determined that it is a new zone, the process proceeds to step S14 where a process for changing the frequency-dividing ratio of the PLL circuit 41 is performed. Then, a check is made in step S15 to determine if the band of the track number read in step S12 is a new band. When it is determined that it is a new band, the process proceeds to step S16 where the control circuit 38 causes the rotational velocity of the spindle motor 31 to change to an angular velocity corresponding to the new band.

When it is determined in step S13 that the zone is not a new zone, the process of steps S14 to S16 is skipped. Further, when it is determined in step S15 that the band of the read track number is not a new band, the process of step S16 is skipped.

As described above, as shown in FIG. 24, each zone divided into 92 zones 0 to 91 is grouped into bands so that the change widths of the linear velocity in each band are fixed as shown in FIGS. 31 and 32, and each parameter is as shown in FIGS. 37 to 40. In these figures, data in the seven columns on the left side is the same as the case in FIGS. 12 to 15, and data in the three columns on the right side respectively indicates the rotational velocity in each zone, the minimum linear velocity in each zone, and the maximum linear velocity in each zone. As shown in these figures, in this embodiment, zones 0 to 15 are assumed to be a first band, zones 16 to 35 are assumed to be a second band, zones 36 to 60 are assumed to be a third band, and zones 61 to 92 are assumed to be a fourth band.

The length (number of bytes) of each area in the above-described embodiment is an example, and it is possible to appropriately set predetermined values.

Also, when the present invention is applied to a phase-change-type disk, more satisfactory advantages can be obtained.

As described above, according to the recording and reproduction apparatus of claim 1 and the recording and reproduction method of claim 10, data is divided into blocks of a predetermined length, and a front link area and a back link area are respectively added before and after the obtained block in order to form a recording and reproduction unit. An address prerecorded on a rewritable-type disk is detected, and the recording and reproduction unit is recorded on a predetermined area of the rewritable-type disk on the basis of the detected address. Therefore, the position of a synchronization signal recorded on the rewritable-type disk is changed for each incidence of recording. Thus, it becomes possible to prevent thermal stress from accumulating on a recording medium of a rewritable-type disk.

According to the disk of claim 11, a recording and reproduction unit formed in such a way that a front link area and a back link area are added respectively before and after data divided into a predetermined length is recorded thereon, and the recording and reproduction unit is recorded in such a way that the lengths of the front link area and the back link area are changed randomly so that the recording and reproduction unit has a fixed length. Therefore, it becomes possible to protect a recording medium from thermal stress.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A recording and reproduction apparatus for recording data to and reproducing data from a rewritable-type disk, comprising:
   division means for dividing data into blocks of a predetermined length;
   recording and reproduction unit formation means for forming a recording and reproduction unit by adding a front link area and a back link area of a predetermined length before and after said block, respectively, to form a unit block, wherein said front link area and said back link area contain system data configured to synchronize recording timing of said data block by said recording and reproduction unit, wherein a position at which said unit block is formed in said recording and reproduction unit is variable based upon a random value of a data position shift variable;
   address detection means for detecting an address prerecorded on said rewritable-type disk; and
   recording means for recording said recording and reproduction unit on a predetermined area of said rewritable-type disk on the basis of an output from said address detection means;
   wherein said recording and reproduction unit formation means randomly changes the position of said front link area and said back link area;
   wherein said random value of said data position shift variable ranges between 0 and 64 bytes;
   wherein said system data is taken from the group consisting of slice/PLL data, frame synchronization signals, or data for adjusting the mark length of the last data and for returning signal polarity; and further
   wherein said recording and reproduction unit formation means forms, in said back link area, a postguard area for preventing data from mutually interfering, a starting point of said lice/PLL data overlapping with a link area of said postguard area by 8 bytes.

2. The apparatus of claim 1 wherein said rewritable-type disk is a phase-change-type disk.

3. The apparatus of claim 1 wherein said recording means records a first and a second recording and reproduction unit so that a part of said back link area of said first recording and reproduction unit and a part of said front link area of said second recording and reproduction unit overlap.

4. The apparatus of claim 3, wherein said recording means records a first and a second recording and reproduction unit so that the final synchronization signal of said back link area of said first recording and reproduction unit and the first synchronization signal of said front link area of said second recording and reproduction unit do not overlap.

5. The apparatus of claim 1, further comprising addition means for adding a synchronization signal to said data, wherein a synchronization signal added by said addition means is formed similar to a synchronization signal recorded on a read-only disk.

6. The apparatus of claim 5, further comprising second addition means for adding a synchronization signal to said front link area or said back link area,
   wherein a synchronization signal added by said second addition means is formed similar to the end portion of the synchronization signal added by said addition means.

7. The apparatus of claim 1, wherein the length of said back link area is made to be one or more data frames.

8. A recording and reproduction method for recording data to and reproducing data from a rewritable-type disk, comprising:
   a dividing step for dividing data into blocks of a predetermined length;
   a recording and reproduction unit formation step for forming a recording and reproduction unit by adding a front link area and a back link area of a predetermined length before and after said block, respectively, to form a unit block, wherein said front link area and said back link area contain system data configured to synchronize recording timing of said data block by said recording and reproduction unit, wherein a position at which said unit block is formed in said recording and reproduction unit is variable based upon a random value of a data position shift variable;
   an address detection step for detecting an address prerecorded on said rewritable-type disk; and
   a recording step for recording said recording and reproduction unit on a predetermined area of said rewritable-type disk on the basis of the address detected in said address detection step;
   wherein said recording and reproduction unit formation step includes the step of randomly changing the position of said front link area and said back link area;
   wherein said random value of said data position shift variable ranges between 0 and 64 bytes;
   wherein said system data is taken from the group consisting of slice/PLL data, frame synchronization signals, or data for adjusting the mark length of the last data and for returning signal polarity; and further
   wherein said recording and reproduction unit formation step forms, in said back link area, a postguard area for preventing data from mutually interfering, a starting point of said lice/PLL data overlapping with a link area of said postguard area by 8 bytes.

9. A disk capable of repeatedly writing data thereto, wherein a recording and reproduction unit formed with a front link area and a back link area added before and after data divided into a predetermined length, respectively, forming a unit block, is recorded, wherein said front link area and said back link area contain system data configured to synchronize recording timing of said data block by said recording and reproduction unit, wherein a position at which said unit block is formed in said recording and reproduction unit is variable based upon a random value of a data position shift variable, wherein the position of said back link area and said front link area are randomly changed, wherein said random value of said data position shift variable ranges between 0 and 64 bytes, wherein said system data is taken from the group consisting of slice/PLL data, frame synchronization signals, or data for adjusting the mark length of the last data and for returning signal polarity, wherein said recording and reproduction unit forms, in said back link area, a postguard area for preventing data from mutually interfering, a starting point of said lice/PLL data overlapping with a link area of said postguard area by 8 bytes.

10. The disk of claim 9 wherein said disk is a phase-change-type disk.

11. The disk claim 9 wherein a synchronization signal recorded in such a manner as to be added to said data is formed similar to a synchronization signal recorded on a read-only disk.

12. The disk of claim 9 wherein a synchronization signal recorded on said front link area or said back link area is formed similar to a synchronization signal recorded on the end portion of said data.

13. The method of claim 8 wherein said rewritable-type disk is a phase-change-type disk.

14. The method of claim 8 wherein said recording step includes the step of recording a first and a second recording and reproduction unit so that a part of said back link area of said first recording and reproduction unit and a part of said front link area of said second recording and reproduction unit overlap.

15. The method of claim 14 wherein said recording step includes the step of recording a first and a second recording and reproduction unit so that the final synchronization signal of said back link area of said first recording and reproduction unit and the first synchronization signal of said front link area of said second recording and reproduction unit do not overlap.

16. The method of claim 8 further including a first adding step for adding a synchronization signal to said data, wherein said synchronization signal is formed similar to a synchronization signal recorded on a read-only disk.

17. The method of claim 16 further including a second adding step for adding a synchronization signal to said front link area or said back link area, wherein a synchronization signal added by said second adding step is formed similar to the end portion of the synchronization signal added by said first adding step.

18. The method of claim 8 wherein the length of said back link area is made to be one or more data frames.

19. A recording and reproduction apparatus for recording data to and reproducing data from a rewritable-type disk, comprising:
a divider for dividing data into blocks of a predetermined length;
a recording and reproduction unit formation unit for forming a recording and reproduction unit by adding a front link area and a back link area of a predetermined length before and after said block, respectively, to form a unit block, wherein said front link area and said back link area contain system data configured to synchronize recording timing of said data block by said recording and reproduction unit;
an address detection unit for detecting an address prerecorded on said rewritable-type disk; and
a recording unit for recording said recording and reproduction unit on a predetermined area of said rewritable-type disk on the basis of an output from said address detection unit;
wherein a position at which said unit block is formed in said recording and reproduction unit is variable based upon a random value of a data position shift variable, said random value of said data position shift variable ranging between 0 and 64 bytes;
wherein said recording and reproduction unit formation unit randomly changes the position of said front link area and said back link area;
wherein said system data is taken from the group consisting of slice/PLL data, frame synchronization signals, or data for adjusting the mark length of the last data and for returning signal polarity, and further wherein said recording and reproduction unit formation unit forms, in said back link area, a postguard area for preventing data from mutually interfering, a starting point of said lice/PLL data overlapping with a link area of said postguard area by 8 bytes.

20. The apparatus of claim 19 wherein said rewritable-type disk is a phase-change-type disk.

21. The apparatus of claim 20 wherein said recording unit records a first and a second recording and reproduction unit so that a part of said back link area of said first recording and reproduction unit and a part of said front link area of said second recording and reproduction unit overlap.

22. The apparatus of claim 21 wherein said recording unit records a first and a second recording and reproduction unit so that the final synchronization signal of said back link area of said first recording and reproduction unit and the first synchronization signal of said front link area of said second recording and reproduction unit do not overlap.

23. The apparatus of claim 22 further including a first addition unit for adding a synchronization signal to said data, wherein a synchronization signal added by said first addition unit is formed similar to a synchronization signal recorded on a read-only disk.

24. The apparatus of claim 23 further including a second addition unit for adding a synchronization signal to said front link area or said back link area, wherein a synchronization signal added by said second addition unit is formed similar to the end portion of the synchronization signal added by said first addition unit.

25. The apparatus of claim 24 wherein the length of said back link area is made to be one or more data frames.

26. The apparatus of claim 24 wherein said recording unit records a first and a second recording and reproduction unit so that a part of said back link area of said first recording and reproduction unit and a part of said front link area of said second recording and reproduction unit overlap.

27. The apparatus of claim 26 wherein said recording unit records a first and a second recording and reproduction unit so that the final synchronization signal of said back link area of said first recording and reproduction unit and the first synchronization signal of said front link area of said second recording and reproduction unit do not overlap.

28. The apparatus of claim 27 further including a first addition unit for adding a synchronization signal to said data, wherein a synchronization signal added by said first addition unit is formed similar to a synchronization signal recorded on a read-only disk.

29. The apparatus of claim 28 further including a second addition unit for adding a synchronization signal to said front link area or said back link area, wherein a synchronization signal added by said second addition unit is formed similar to the end portion of the synchronization signal added by said first addition unit.

30. The apparatus of claim 29 wherein the length of said back link area is made to be one or more data frames.

31. The apparatus of claim 19, wherein said recording unit records a first and a second recording and reproduction unit so that a part of said back link area of said first recording and reproduction unit and a part of said front link area of said second recording and reproduction unit overlap.

32. The apparatus of claim 31 wherein said recording unit records a first and a second recording and reproduction unit so that the final synchronization signal of said back link area of said first recording and reproduction unit and the first synchronization signal of said front link area of said second recording and reproduction unit do not overlap.

33. The apparatus of claim 32 further including a first addition unit for adding a synchronization signal to said data, wherein a synchronization signal added by said first addition unit is formed similar to a synchronization signal recorded on a read-only disk.

34. The apparatus of claim 33 further including a second addition unit for adding a synchronization signal to said front link area or said back link area, wherein a synchronization signal added by said second addition unit is formed similar to the end portion of the synchronization signal added by said first addition unit.

35. The apparatus of claim 34 wherein the length of said back link area is made to be one or more data frames.

36. The apparatus of claim 19 wherein said recording unit records a first and a second recording and reproduction unit so that the final synchronization signal of said back link area of said first recording and reproduction unit and the first synchronization signal of said front link area of said second recording and reproduction unit do not overlap.

37. The apparatus of claim 36 further including a first addition unit for adding a synchronization signal to said data, wherein a synchronization signal added by said first addition unit is formed similar to a synchronization signal recorded on a read-only disk.

38. The apparatus of claim 37 further including a second addition unit for adding a synchronization signal to said front link area or said back link area, wherein a synchronization signal added by said second addition unit is formed similar to the end portion of the synchronization signal added by said first addition unit.

39. The apparatus of claim 38 wherein the length of said back link area is made to be one or more data frames.

40. The apparatus of claim 19 further including a first addition unit for adding a synchronization signal to said data, wherein a synchronization signal added by said first addition unit is formed similar to a synchronization signal recorded on a read-only disk.

41. The apparatus of claim 40 further including a second addition unit for adding a synchronization signal to said front link area or said back link area, wherein a synchronization signal added by said second addition unit is formed similar to the end portion of the synchronization signal added by said first addition unit.

42. The apparatus of claim 41 wherein the length of said back link area is made to be one or more data frames.

43. The apparatus of claim 19 wherein the length of said back link area is made to be one or more data frames.

44. The apparatus of claim 19 wherein the length of said back link area is made to be one or more data frames.

* * * * *

UNITED STATES PATENT AND TRADEMARK OFFICE
CERTIFICATE OF CORRECTION

PATENT NO. : 6,256,276 B1
DATED : July 3, 2001
INVENTOR(S) : Shoei Kobayashi et al.

Page 1 of 1

It is certified that error appears in the above-identified patent and that said Letters Patent is hereby corrected as shown below:

Column 17,
Line 66, delete "lice" and insert -- slice --.

Column 18,
Line 64, delete "lice" and insert -- slice --.

Column 19,
Line 18, delete "lice" and insert -- slice --.
Line 22, insert -- of -- after "disk".

Column 20,
Line 24, delete "lice" and insert -- slice --.

Signed and Sealed this

Fifth Day of March, 2002

Attest:

JAMES E. ROGAN
*Attesting Officer*  *Director of the United States Patent and Trademark Office*